(12) United States Patent
Beniyama et al.

(10) Patent No.: US 7,725,675 B2
(45) Date of Patent: May 25, 2010

(54) STORAGE CAPACITY MANAGEMENT SYSTEM IN DYNAMIC AREA PROVISIONING STORAGE

(75) Inventors: Nobuo Beniyama, Yokohama (JP); Hiroshi Nojima, Fujisawa (JP); Akihiko Sakaguchi, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 587 days.

(21) Appl. No.: 11/637,091

(22) Filed: Dec. 12, 2006

(65) Prior Publication Data
US 2008/0091748 A1    Apr. 17, 2008

(30) Foreign Application Priority Data
Oct. 16, 2006   (JP) .............................. 2006-281277

(51) Int. Cl.
G06F 12/00  (2006.01)
G06F 13/00  (2006.01)
G06F 13/28  (2006.01)

(52) U.S. Cl. ....................... 711/170; 711/173; 711/154
(58) Field of Classification Search .................. 711/170
See application file for complete search history.

(56) References Cited

U.S. PATENT DOCUMENTS

2003/0005152 A1* 1/2003 Diwan et al. ................ 709/239
2005/0091654 A1* 4/2005 Lection et al. .............. 718/100
2005/0108292 A1* 5/2005 Burton et al. ............... 707/200
2005/0135397 A1* 6/2005 Hoban et al. ................ 370/428
2006/0101081 A1* 5/2006 Lin et al. .................... 707/200
2006/0129339 A1* 6/2006 Bruno ......................... 702/60
2007/0239793 A1* 10/2007 Tyrrell et al. ............... 707/200

FOREIGN PATENT DOCUMENTS

JP     2004-110321      4/2004

* cited by examiner

*Primary Examiner*—Matt Kim
*Assistant Examiner*—Ralph A Verderamo, III
(74) *Attorney, Agent, or Firm*—Antonelli, Terry, Stout & Kraus, LLP.

(57) ABSTRACT

Provided is a capacity monitoring method used for a computer system including one or more application computers, one or more storage systems, and a management computer. The storage system includes a physical disk and a disk controller. In the capacity monitoring method, a storage area of the physical disk belongs to a storage pool, the storage system provides a volume, and the management computer monitors a used capacity of the storage pool, judges whether or not a storage capacity required for operating the application computer for a predetermined time period is present in the storage pool based upon an increasing speed of the used capacity of the storage pool to be monitored, and executes a predetermined process operation when the storage capacity required for operating the application computer for the predetermined time period is not present in the storage pool. Accordingly, the storage pool is properly operated and managed.

20 Claims, 15 Drawing Sheets

| APPLICATION NAME 411 | APPLICATION SERVER ADDRESS 412 | USED VOLUME NUMBER 413 | OPERATION STATUS 414 | OPERATION TARGET EXPIRATION 415 | OPERABLE PREDICTION EXPIRATION 416 | UNUSED ALLOCATION CAPACITY 417 |
|---|---|---|---|---|---|---|
| AP1 | 10.208.39.12 | 01, 03, 08 | OPERATING | 2006/7/30 00:13 | 2006/7/30 00:13 | 200GB |
| AP2 | 10.208.39.12 | 02, 09, 23 | I/O-LIMITED | 2006/7/25 00:13 | 2006/7/23 04:16 | 120GB |
| AP3 | 10.208.39.12 | 45, 29, F2 | SUSPENDED | 2006/7/25 00:13 | - | 100GB |

APPLICATION MANAGEMENT DATA TABLE

*FIG. 5*

| 421 | 422 |
|---|---|
| STORAGE SYSTEM NAME | STORAGE SYSTEM ADDRESS |
| 0001 | 10.208.39.10 |

42

STORAGE MANAGEMENT DATA TABLE

FIG. 6

| 431 | 432 | 433 | 434 | 435 |
|---|---|---|---|---|
| VOLUME NUMBER | VIRTUAL CAPACITY | DATE/TIME | USED CAPACITY | CONSUMPTION SPEED PREDICTION VALUE |
| 01 | 200GB | 2006/7/7 05:00 | 99.7GB | 0.30GB/Hour |
| | | 2006/7/7 04:00 | 99.3GB | 0.29GB/Hour |
| | | 2006/7/7 03:00 | 98.5GB | 0.28GB/Hour |

43

VOLUME CAPACITY HISTORY DATA TABLE

FIG. 7

| APPLICATION NAME (441) | DATE/TIME (442) | USED CAPACITY (443) | CONSUMPTION SPEED PREDICTION VALUE (444) |
|---|---|---|---|
| AP1 | 2006/7/7 05:00 | 200.4GB | 21.4GB/Hour |
| | 2006/7/7 04:00 | 180.4GB | 30.5GB/Hour |
| | 2006/7/7 03:00 | 157.8TB | 40.2GB/Hour |

44

APPLICATION CAPACITY HISTORY DATA TABLE

FIG. 8

| POOL CAPACITY (451) | DATE/TIME (452) | USED CAPACITY (453) | UNUSED CAPACITY (454) | CONSUMPTION SPEED PREDICTION VALUE (455) |
|---|---|---|---|---|
| 200TB | 2006/7/7 05:00 | 90.2TB | 109.8TB | 1.9TB/Hour |
| | 2006/7/7 04:00 | 88.3TB | 111.7TB | 2.2TB/Hour |
| | 2006/7/7 03:00 | 85.0TB | 115.0TB | 2.5TB/Hour |

45

STORAGE POOL CAPACITY HISTORY DATA TABLE

FIG. 9

| REMAINING OPERATION TIME THRESHOLD VALUE (DEFAULT) | ABNORMAL OPERATION THRESHOLD VALUE |
|---|---|
| 10 DAYS | 10 GB/Hour OR 200% |

46
STORAGE POOL MONITORING DEFINITION DATA TABLE

FIG. 10

| APPLICATION NAME | PRIORITY | Write I/O LIMITATION | REMAINING OPERATION TIME THRESHOLD VALUE | ABNORMAL OPERATION THRESHOLD VALUE |
|---|---|---|---|---|
| AP1 | HIGH | IMPOSSIBLE | 15 DAYS | 20 GB/Hour OR 300% |
| AP2 | MEDIUM | POSSIBLE (20%) | DEFAULT | DEFAULT |
| AP3 | LOW | POSSIBLE (20%) | DEFAULT | DEFAULT |

47
APPLICATION MONITORING DEFINITION DATA TABLE

FIG. 11

ABSTRACT# STORAGE CAPACITY MANAGEMENT SYSTEM IN DYNAMIC AREA PROVISIONING STORAGE

CLAIM OF PRIORITY

The present application claims priority from Japanese patent application P2006-281277 filed on Oct. 16, 2006, the content of which is hereby incorporated by reference into this application.

BACKGROUND

This invention relates to a computer system equipped with a storage system, and more particularly, to a technique for monitoring a storage capacity.

Storage systems provide logical volumes (LUs) to application servers by statically allocating storage areas of physical disks. However, the LUs have the below-mentioned problems.

That is, for instance, there is a problem in that storage capacities of physical disks which are allocated to application servers become larger than storage capacities which are actually used for the application servers (namely, over provisioning). This is because storage capacities which are used for application programs operating on the application servers cannot be correctly grasped. There is another problem in that operational costs required to change the capacities of the LUs are high.

As a technique for solving those problems, thin provisioning is known. Storage systems provide volumes (thin provisioning volumes) realized by the thin provisioning to the application programs operating on the application servers.

Thus, the storage systems can provide the thin provisioning volumes which are recognized as volumes having larger storage capacities than the storage capacities of physical disks which are actually allocated. Upon reception of write requests from the application programs operating on the application servers to the thin provisioning volume, the storage systems dynamically allocate an unused storage area of a storage pool to the thin provisioning volume which are requested by the above-mentioned write requests.

On the other hand, JP 2004-110321 A discloses a data management system for managing used storage capacities of storage systems for each project in an business-to-business collaboration application.

SUMMARY

In the thin provisioning, a storage pool is commonly used by a plurality of application programs. Accordingly, when the unused storage area of the storage pool are exhausted, all of the application programs which commonly use the storage pool are adversely affected.

On the other hand, in order to prevent the above-mentioned over provisioning in the thin provisioning, it is preferable that the unused storage area of a storage pool is small. Thus, in the thin provisioning, proper operations and proper management of the storage pool constitute a major factor.

This invention has been made to solve the above-mentioned problems, and it is therefore an object of this invention to provide a computer system capable of operating and managing a storage pool in a proper manner.

According to an exemplary embodiment of this invention, there is provided a capacity monitoring method used for a computer system, the computer system comprising: at least one application computer including a processor, a memory, and an interface; at least one storage system coupled to the application computer; and a management computer including a processor, a memory, and an interface, which is allowed to access the application computer and the storage system, the storage system comprising: a physical disk for storing therein data which is required to be written by the application computer; and a disk controller for controlling an input/output of data to the physical disk, the physical disk having a storage area belonging to a storage pool, the capacity monitoring method comprising: providing, by the storage system, to the application computer at least one volume to which data is required to be written from the application computer; executing, by the application computer, at least one application program which requests to read/write data from/to the volume; allocating, by one of the management computer and the storage system, a part or entirety of the storage area belonging to the storage pool to the volume; monitoring, by the management computer, a used capacity of the storage pool corresponding to a capacity of a storage area which is allocated to the volume within the storage area belonging to the storage pool, and an unused capacity of the storage pool corresponding to a capacity of a storage area which is not allocated to the volume within the storage area belonging to the storage pool; judging, by the management computer, whether or not a storage capacity required for operating the application computer for a predetermined time period is present in the storage pool based upon an increasing speed of the used capacity of the storage pool to be monitored, and the unused capacity of the storage pool to be monitored; and executing, by the management computer, a predetermined process operation in the case where the storage capacity required for operating the application computer for the predetermined time period is not present in the storage pool.

In accordance with a typical embodiment of this invention, the storage pool can be operated and managed in the proper manner.

BRIEF DESCRIPTION OF THE DRAWINGS

The present invention can be appreciated by the description which follows in conjunction with the following figures, wherein:

FIG. 5 is a configuration diagram of the application management data table stored in the management database of the first embodiment of this invention;

FIG. 6 is a configuration diagram of the storage management data table stored in the management database of the first embodiment of this invention;

FIG. 7 is a configuration diagram of the volume capacity history data table stored in the management database of the first embodiment of this invention;

FIG. 8 is a configuration diagram of the application capacity history data table stored in the management database of the first embodiment of this invention;

FIG. 9 is a configuration diagram of the storage pool capacity history data table stored in the management database of the first embodiment of this invention;

FIG. 10 is a configuration diagram for showing a storage pool monitoring definition data table stored in the management database of the first embodiment of this invention;

FIG. 11 is a configuration diagram of the application monitoring definition data table stored in the management database of the first embodiment of this invention;

DETAILED DESCRIPTION OF THE PREFERRED EMBODIMENTS

Referring now to the accompanying drawings, embodiments of this invention will be described below.

First Embodiment

Figure 1:
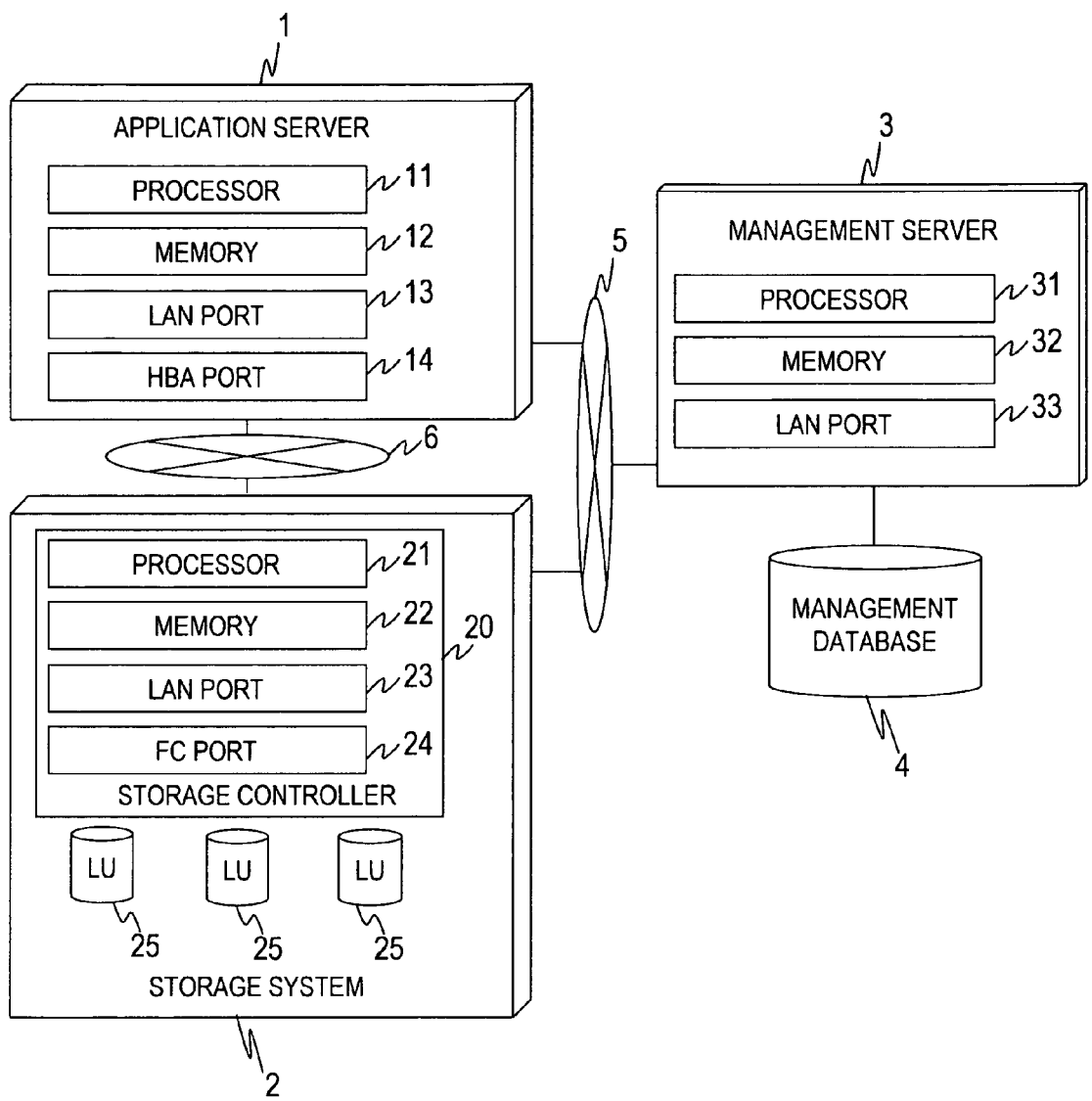
FIG. 1 is a diagram of a configuration of a computer system according to a first embodiment of this invention.

FIG. 1 is a diagram of a configuration of a computer system according to a first embodiment of this invention.

The computer system includes an application server 1, a storage system 2, a management server 3, a management database 4, a management local area network (LAN) 5, and a storage area network (SAN) 6. Although one application server 1 and one storage system 2 are illustrated in FIG. 1, a plurality of servers and systems may be alternatively provided in the computer system.

The SAN 6 corresponds to a network which is employed so as to connect the application server 1 with the storage system 2. The management LAN 5 corresponds to a network which is employed so as to connect application server 1, the storage system 2, and the management server 3 with each other.

The storage system 2 is equipped with a storage controller 20 and a physical disk.

The storage controller 20 reads/writes data from/to the physical disk. The storage controller 20 sets a storage area of the physical disk as one or more logical volumes (LUs) 25.

Further, the storage controller 20 is provided with a processor 21, a memory 22, a LAN port 23, and an FC port 24.

The processor 21 executes a plurality of programs stored in the memory 22, thereby performing various sorts of process operations. The memory 22 stores therein the programs which are executed by the processor 21, and information and the like, which are required for the processor 21. The LAN port 23 corresponds to an interface which is connected via the management LAN 5 to the management server 3. The FC port 24 corresponds to an interface which is connected via the SAN 6 to the application server 1.

The application server 1 requests the storage system 2 to read and write data. The application server 1 includes a processor 11, a memory 12, a LAN port 13, and an HBA port 14.

The processor 11 executes programs stored in the memory 12, thereby performing various sorts of process operations. The memory 12 stores therein the programs which are executed by the processor 11, and information and the like which are required for the processor 11. The LAN port 13 corresponds to an interface which is connected via the management LAN 5 to the management server 3. The HBA port 14 corresponds to an interface which is connected via the SAN 6 to the storage system 2.

The management server 3 is connected to the management database 34. The management server 3 refers to information stored in the management database 34 so as to manage the application server 1 and the storage system 2. The management server 3 includes a processor 31, a memory 32, and a LAN port 33.

The processor 31 executes programs stored in the memory 32, thereby performing various sorts of process operations. The memory 32 stores therein the programs which are executed by the processor 31, and information and the like which are required for the processor 31. The LAN port 33 corresponds to an interface which is connected via the management LAN 5 to the management server 1 and the storage system 2. It should be noted that the management server 3 will be described in detail with reference to FIG. 3.

The management database 4 stores therein information to which the management server 3 refers. It should also be noted that the management database 4 will be described in detail with reference to FIG. 4.

Figure 2:
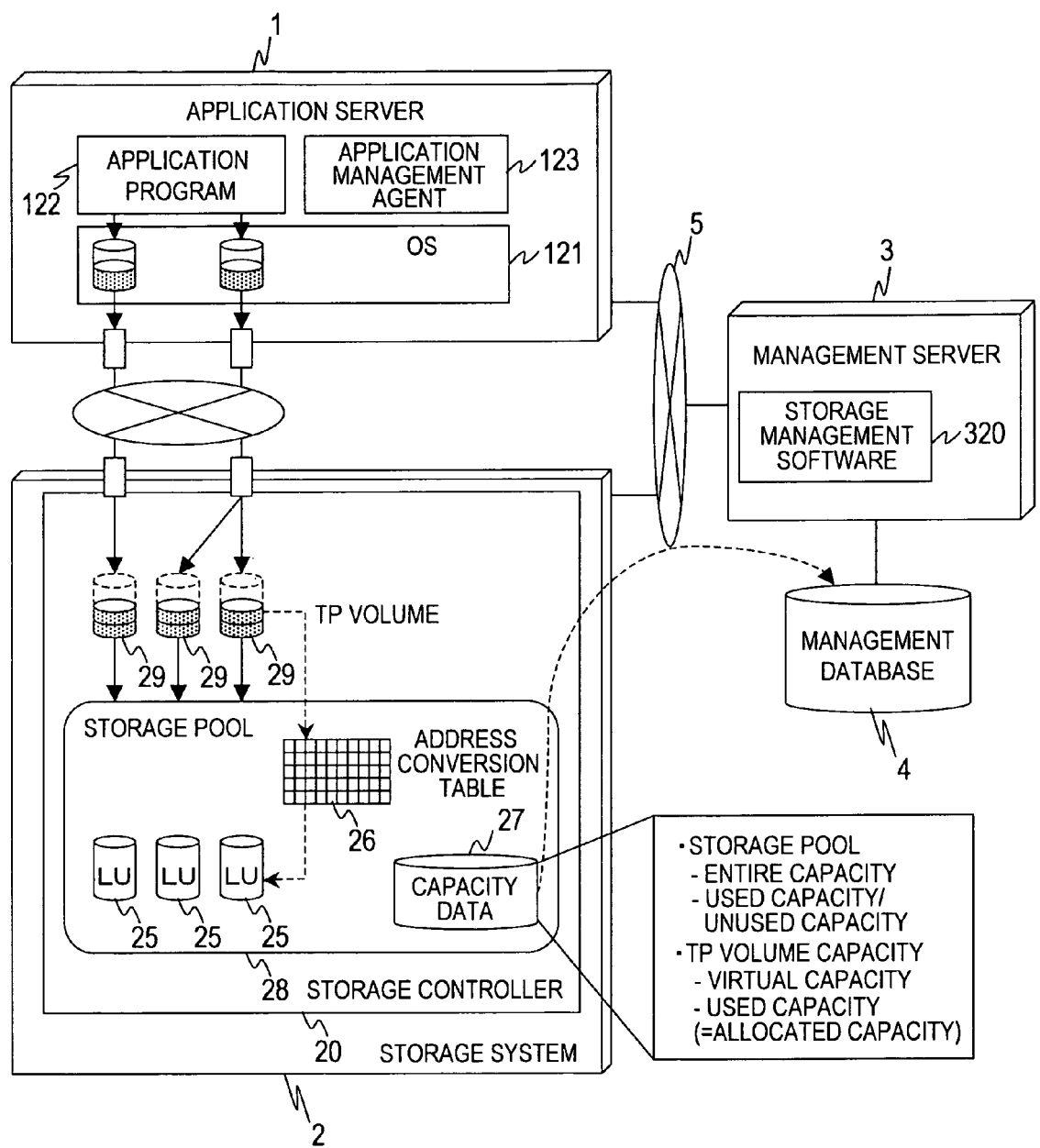
FIG. 2 is a block diagram for indicating a functional configuration of the computer system according to the first embodiment of this invention.

FIG. 2 is a block diagram for indicating a functional configuration of the computer system according to the first embodiment of this invention.

The storage controller 20 provided in the storage system 2 manages a storage pool 28 containing one or more LUs 25. In other words, the storage controller 20 sets a storage area of the LU 25 as the storage pool 28. It should also be noted that the storage controller 20 may alternatively manage a plurality of storage pools 28.

The storage controller 20 provides one or more thin provisioning volumes 29 to the application server 1. The thin provisioning volume 29 is recognized from an application program 122 operated on the application server 1 as a volume having a virtual capacity (virtual capacity) larger than a capacity of a storage area (used storage area) which has been actually allocated.

Upon reception of a write request to the thin provisioning volume 29, the storage controller 20 allocates an unused storage area of the storage pool 28 to the write-requested thin provisioning volume 29. It should also be noted that an unused storage area of the storage pool 28 is such a storage area that has not been allocated to any of the thin provisioning volumes 28 among the storage area (namely, entire storage area of storage pool 28) contained in the storage pool 28.

The storage controller 20 stores therein an address conversion table 26 and a capacity data 27. The address conversion table 26 represents a correspondence between addresses of storage areas in the thin provisioning volumes 29, and addresses of storage areas in the LUs 25.

Thus, when data read/write requests are issued with respect to the thin provisioning volume 29, the storage controller 20 refers to the address conversion table 26 so as to read/write data from/to the LU 25.

It should also be noted that the storage controller 20 may not set the storage area of the physical disk as the LU 25. In this case, the address conversion table 26 indicates a correspondence between the addresses of the storage areas in the thin provisioning volumes 29, and the addresses of the storage areas in the physical disks. When data read/write requests are issued with respect to the thin provisioning volume 29, the storage controller 20 refers to the address conversion table 26 so as to read/write data from/to the physical disks.

The storage controller 20 stores therein the capacity data 27. The capacity data 27 contains an entire capacity of the storage pool 28, a used capacity of the storage pool 28, and an unused capacity of the storage pool 28.

The entire capacity of the storage pool 28 corresponds to a capacity of the storage area (namely, entire storage area of storage pool 28) contained in the storage pool 28. The used capacity of the storage pool 28 corresponds to a capacity of a storage area which has been allocated to any of the thin provisioning volumes 29 (namely, used storage area of storage pool 28) in the entire storage area of the storage pool 28. The unused capacity of the storage pool 28 corresponds to a capacity of a storage area which has not been allocated to any of the thin provisioning volumes 29 (namely, unused storage area of storage pool 28) in the entire storage area of the storage pool 28.

The capacity data 27 further contains a virtual capacity of the thin provisioning volume 29 and a used capacity of the thin provisioning volume 29. The virtual capacity of the thin provisioning volume 29 corresponds to a capacity which is recognized by the application program 122 running on the application server 1 as a capacity of the thin provisioning volume 29. The used capacity of the thin provisioning volume 29 corresponds to a capacity of a storage area which has been allocated to the thin provisioning volume 29 among the used storage area of the storage pool 28.

The memory 12 of the application server 1 stores therein an operation system (OS) 121, the application program 122, and an application management agent 123.

The OS 121 controls entire process operations of the application server 1. The application program 122 executes various sorts of process operations. For example, the application program 122 requests data read/write operations from/to the thin provisioning volumes 29 to the storage system 2.

The application management agent 123 controls execution statuses of application program 122. For example, upon reception of an instruction to stop the execution of the application program 122 from the management server 3, the application management agent 123 instructs the application program 122 to stop the execution thereof.

A memory 32 of the management server 3 stores therein storage management software 320.

The storage management software 320 refers to information stored in the management database 4 so as to manage the application server 1 and the storage system 2. The storage management software 320 acquires the capacity data 27 from the storage controller 20. Then, the storage management software 320 updates the management database 4 based upon the acquired capacity data 27.

Figure 3:
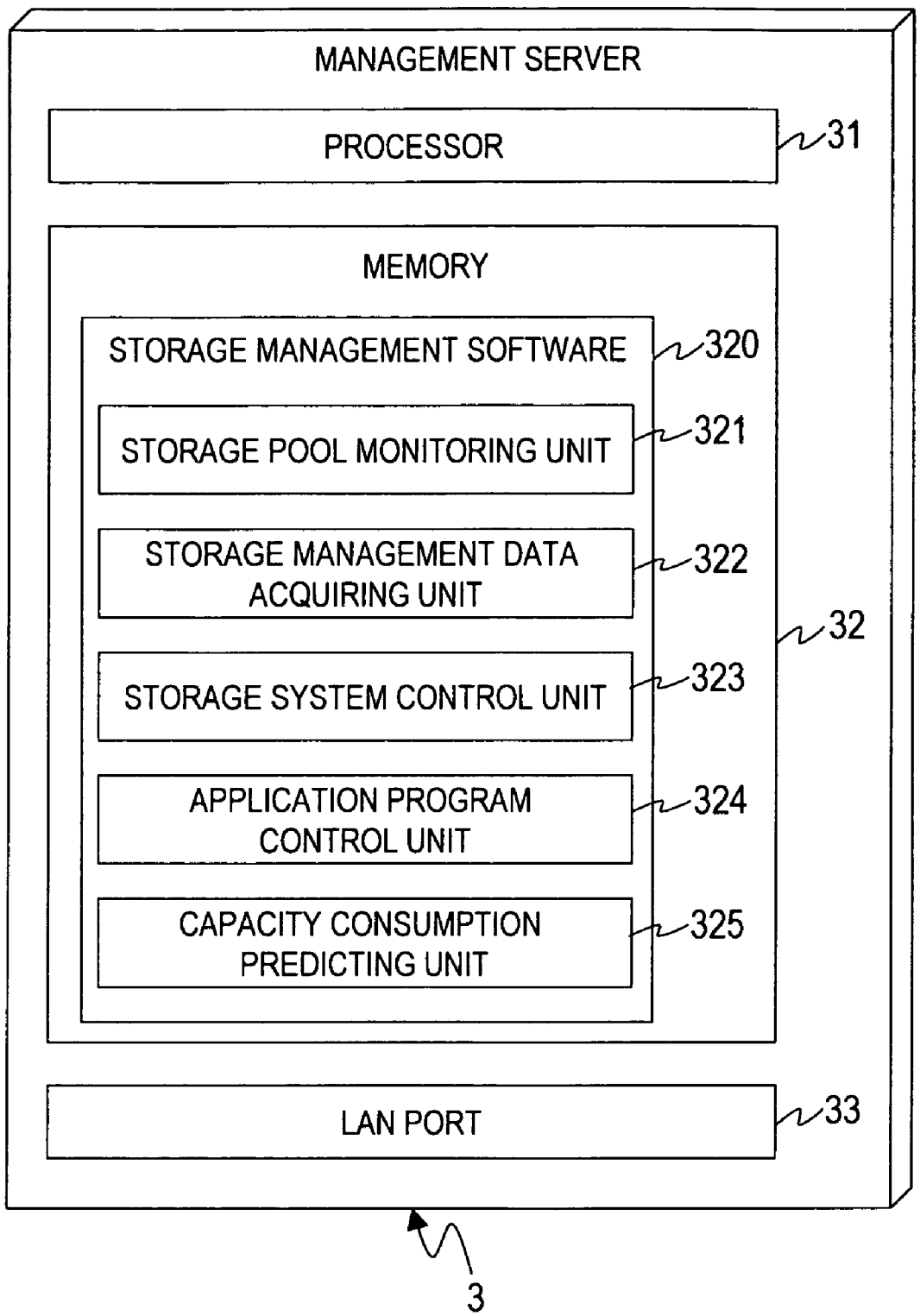
FIG. 3 is a block diagram for showing a configuration of the management server of the first embodiment of this invention.

FIG. 3 is a block diagram for showing a configuration of the management server 3 of the first embodiment of this invention.

The management server 3 includes the processor 31, the memory 32, and the LAN port 33. The memory 32 stores therein the storage management software 320. The storage management software 320 contains a storage pool monitoring unit 321, a storage management data acquiring unit 322, a storage system control unit 323, an application program control unit 324, and a capacity consumption predicting unit 325.

The storage management data acquiring unit 322 acquires the capacity data 27 from the storage system 2 in a periodic manner.

The storage pool monitoring unit 321 monitors the capacity of the storage pool 28 while the entire capacity of the storage pool 28 is defined as one unit during the normal operation. For example, the storage pool monitoring unit 321 judges whether or not an unused capacity of the storage pool 28 is a sufficiently large amount. When the unused capacity of the storage pool 28 is not the sufficiently large amount, the storage monitoring unit 321 switches the operation under the normal condition into an operation when the unused capacity of the storage pool 28 becomes smaller than a threshold value (hereinafter, referred to as "below-threshold-condition operation").

In below-threshold-condition operation, the storage pool monitoring unit 321 monitors the capacity of the storage pool 28 while capacity of the storage area used by the application program 122 running on the application server 1 is defined as one unit. For instance, the storage pool monitoring unit 321 monitors the used capacity of the application program 122 running on the application server 1. It should also be noted that the used capacity of the application program 122 corresponds to a capacity of a storage area which has been allocated to the thin provisioning volume 29 used in the application program 122 among the used storage area of the storage pool 28. Then, the storage pool monitoring unit 321 judges whether or not the execution of the application program 122 is required to be controlled based upon the monitoring result.

The storage system control unit 323 controls the storage system 2. For instance, the storage system control unit 323 instructs the storage system 2 to execute a write I/O limitation to the thin provisioning volume 29 or the like.

The application program control unit 324 controls the application program 122 running on the application server 1. For example, the application program control unit 324 instructs the application management agent 123 running on the application server 1 to stop the execution of the application program 122.

The capacity consumption predicting unit 325 calculates a prediction value of a capacity consumption speed based upon the information stored in the management database 4. The capacity consumption predicting unit 325 calculates a prediction value of a capacity consumption speed with respect to each of the application program 122, the thin provisioning volume 29, and the storage pool 28. Further, the capacity consumption predicting unit 325 judges whether or not the application program 122 is executed under an abnormal condition.

It should also be noted that the storage management software 320 may be alternatively executed by any one of the application server 1 and the storage system 2. In this case, the management server 3 is no longer required.

Figure 4:
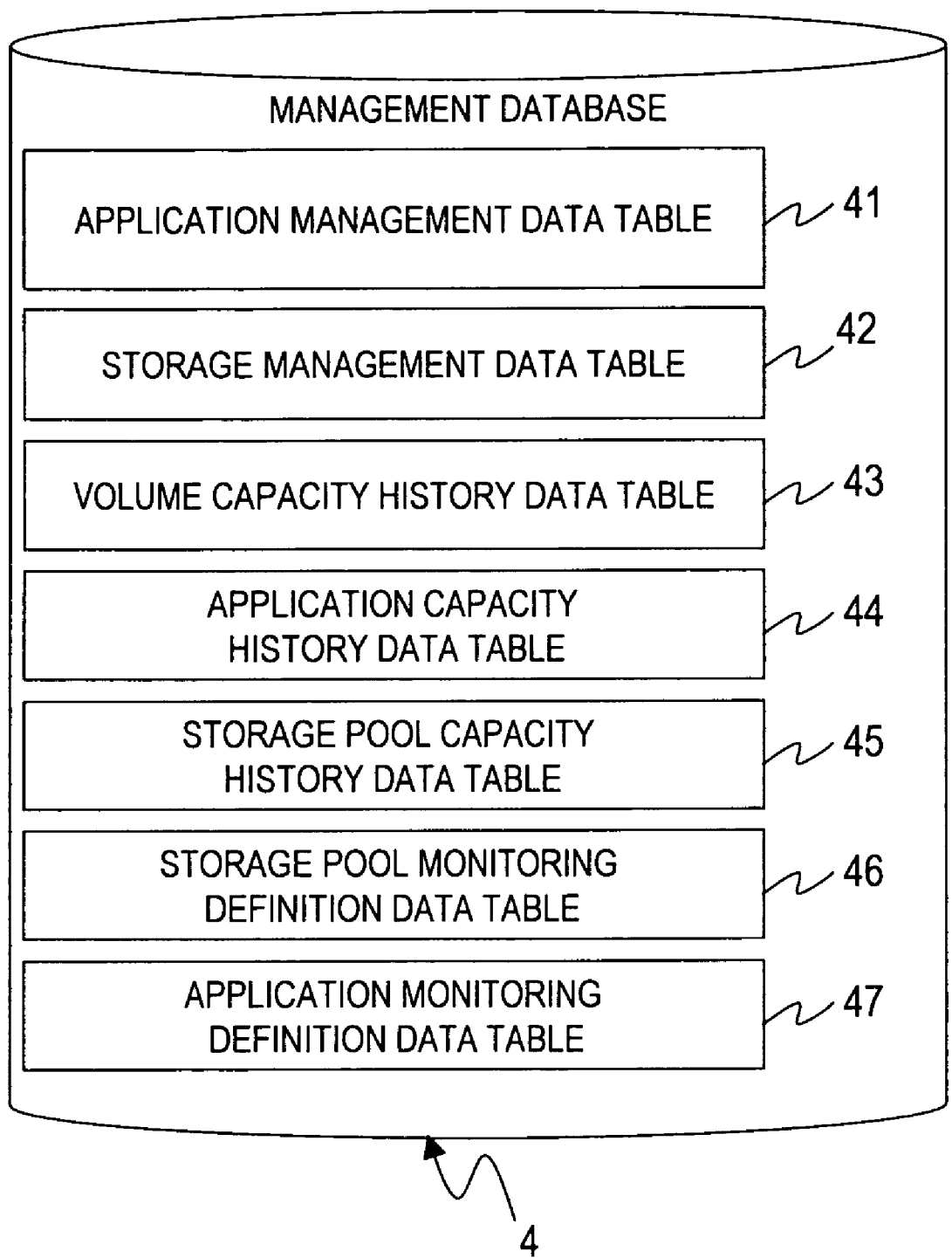
FIG. 4 is a block diagram for showing a configuration of the management database of the first embodiment of this invention.

FIG. 4 is a block diagram for showing a configuration of the management database 4 of the first embodiment of this invention.

The management database 4 stores therein an application management data table 41, a storage management data table 42, a volume capacity history data table 43, an application capacity history data table 44, a storage pool capacity history data table 45, a storage pool monitoring definition data table 46, and an application monitoring definition data table 47.

The application management data table 41 corresponds to information for managing the application program 122 running on the application server 1. It should also be noted that the application management data table 41 will be described in detail with reference to FIG. 5.

The storage management data table 42 corresponds to information for managing the storage system 2. It should also be noted that the storage management data table 42 will be described in detail with reference to FIG. 6.

The volume capacity history data table 43 represents a history related to a used capacity of the thin provisioning volume 29 and the like. It should also be noted that the volume capacity history data table 43 will be described in detail with reference to FIG. 7.

The application capacity history data table 44 represents a history related to a used capacity of the application program 122 and the like. It should also be noted that the application capacity history data table 44 will be described in detail with reference to FIG. 8.

The storage pool capacity history data table 45 represents a history related to a used capacity of the storage pool 28 and the like. It should also be noted that the storage pool capacity history data table 45 will be described in detail with reference to FIG. 9.

The storage pool monitoring definition data table 46 represents conditions used when each capacity of storage area of the storage pool 28 is monitored. It should also be noted that the storage pool monitoring definition data table 46 will be described in detail with reference to FIG. 10.

The application monitoring definition data table 47 represents conditions used when each capacity of storage area used by the application program 122 running on the application server 1 is monitored. It should also be noted that the application monitoring definition data table 47 will be described in detail with reference to FIG. 11.

FIG. 5 is a configuration diagram of the application management data table 41 stored in the management database 4 of the first embodiment of this invention.

The application management data table 41 contains an application name 411, an application server address 412, a used volume number 413, an execution status 414, an execution target expiration 415, an executable prediction expiration 416, and an unused allocation capacity 417.

The application name 411 is an identifier unique to the application program 122 executed by the application server 1. The application server address 412 is an IP address of the application server 1 which executes the application program 122 identified by the application name 411 of the record.

The used volume number 413 is an identifier unique to the thin provisioning volume 29 which can be used by the application program 122 identified by the application name 411 of the record.

The execution status 414 indicates such a status that the application program 122 identified by the application name 411 of the record is operating, I/O-limited, or suspended. It should be noted that when the execution status 414 indicates "I/O-limited", a write I/O to the thin provisioning volume 29 of the storage system 2 from the application program 122 is limited.

The operation target expiration 415 corresponds to a date/time as a target to which the operation of the application program 122 identified by the application name 411 of the record should be continued. It should be noted that no value is stored in the execution target expiration 415 during the normal operation. Then, in the below-threshold-condition operation, the value is stored in the execution target expiration 415.

The operable prediction expiration 416 corresponds to a date/time at which stopping of the execution of the application program 122 identified by the application name 411 of the record is predicted. The executable prediction expiration 416 is calculated based upon a prediction value of the capacity consumption speed of the application program 122. It should also be noted that no value is stored in the operable prediction expiration 416 during the normal operation. Then, in the below-threshold-condition operation, the value is stored in the operable prediction expiration 416. Even in the below-threshold-condition operation, no value is stored in the operable prediction expiration 416 in the case where the execution of the application program 122 is stopped.

The unused allocation capacity 417 corresponds to such a capacity of a storage area which is allocated to the application program 122 identified by the application name 411 of the record among the unused storage area of the storage pool 28. When the capacity allocated to the application program 122 is allocated, in an actual case, the storage area is allocated to the thin provisioning volume 29 which can be used by the application program 122.

It should also be noted that no value is stored in the unused allocation capacity 417 in the execution during the normal operation. When the unused storage area of the storage pool 28 is allocated to the application program 122, a value is stored in the unused allocation capacity 417.

FIG. 6 is a configuration diagram of the storage management data table 42 stored in the management database 4 of the first embodiment of this invention.

The storage management data table 42 contains a storage system name 421 and a storage system address 422.

The storage system name 421 corresponds to an identifier unique to the storage system 2 connected to the management server 3. The storage system address 422 corresponds to an IP address which is allocated to the storage system 2 identified by the storage system name 42 of the record.

FIG. 7 is a configuration diagram of the volume capacity history data table 43 stored in the management database 4 of the first embodiment of this invention.

The volume capacity history data table 43 contains a volume number 431, a virtual capacity 432, a date/time 433, a used capacity 434, and a consumption speed prediction value 435.

The volume number 431 corresponds to an identifier unique to the thin provisioning volume 29 provided by the storage system 2. The virtual capacity 432 corresponds to a virtual capacity of the thin provisioning volume 29 identified by the volume number 431 of the record. In other words, the application program 122 running on the application server 1 recognizes the capacity of the thin provisioning volume 29 as the virtual capacity 432.

The date/time 433 is a date/time when a used capacity of thin provisioning volume 29 identified by the volume number 431 of the record is measured. The used capacity 434 corresponds to a used capacity of the thin provisioning volume 29 identified by the volume number 431 of the record at the date/time 433 of the record.

The consumption speed prediction value 435 corresponds to a prediction value of a speed at which the used capacity of the thin provisioning volume 29 identified by the volume number 431 of the record is increased. The consumption speed prediction value 435 corresponds to a value which is calculated based upon the used capacity 434 of the record. For instance, the capacity consumption predicting unit 325 calculates the consumption speed prediction value 435 based upon the used capacity 434 for past several days or past several hours.

FIG. 8 is a configuration diagram of the application capacity history data table 44 stored in the management database 4 of the first embodiment of this invention.

The application capacity history data table 44 includes an application name 441, a date/time 442, a used capacity 443, and a consumption speed prediction value 444.

The application name 441 corresponds to an identifier unique to the application program 122 which is executed by the application server 1. The date/time 442 is a date/time when a used capacity of the application program 122 identified by the application name 441 of the record is measured.

The used capacity 443 corresponds to a used capacity of the application program 122 identified by the application name 441 of the record at the date/time 442 of the record.

The consumption speed prediction value 444 corresponds to a prediction value of a speed at which the used capacity of the application program 122 identified by the application name 441 of the record is increased. The consumption speed prediction value 444 corresponds to a value which is calculated based upon the used capacity 443 of the record. For instance, the capacity consumption predicting unit 325 calculates the consumption speed prediction value 444 based upon the used capacity 443 for past several days or past several hours.

FIG. 9 is a configuration diagram of the storage pool capacity history data table 45 stored in the management database 4 of the first embodiment of this invention.

The storage pool capacity history data table 45 includes a pool capacity 451, a date/time 452, a used capacity 453, an unused capacity 454, and a consumption speed prediction value 435.

The pool capacity 451 corresponds to a capacity of an entire storage area of the storage pool 28 provided in the storage system 2. The date/time 452 corresponds to a date/time when the used capacity of the storage pool 28 provided in the storage system 2 is measured.

The used capacity 453 corresponds to a capacity of an used storage area of the storage pool 28 provided in the storage system 2 at the date/time 452 of the record. The unused capacity 454 corresponds to a capacity of an unused storage area of the storage pool 28 provided in the storage system 2 at the date/time 452 of the record.

The consumption speed prediction value 455 corresponds to a prediction value of a speed at which the used capacity of the storage pool 28 provided in the storage system 2 is increased. In other words, the consumption speed prediction value 455 corresponds to a prediction value of a speed at which an unused capacity of the storage pool 28 provided in the storage system 2 is decreased.

The consumption speed prediction value 455 corresponds to a value which is calculated based upon the used capacity 453 or unused capacity 454 of the record. For instance, the capacity consumption predicting unit 325 calculates the consumption speed prediction value 455 based upon the used capacity 453 for past several days or past several hours.

It should also be noted that when the storage system 2 includes a plurality of sets of the storage pools 28, the management database 4 stores therein the storage pool capacity history data table 45 for each of the storage pools 28.

FIG. 10 is a configuration diagram for showing a storage pool monitoring definition data table 46 stored in the management database 4 of the first embodiment of this invention.

The storage pool monitoring definition data table 46 contains a remaining operation time threshold value 461 and an abnormal operation threshold value 462.

The remaining operation time threshold value 461 corresponds to a time during which an operation of the application program 122 set to a default should be guaranteed. The reaming operation time threshold value 461 is used to judge switching of operation under a normal condition to a below-threshold-condition operation. For example, the storage pool monitoring unit 321 refers to the remaining operation time threshold value 461 in order to judge whether or not an unused capacity of the storage pool 28 is a sufficiently large capacity. When the unused capacity of the storage pool 28 is not the sufficiently large capacity, the storage pool monitoring unit 321 switches the operation under a normal condition to the below-threshold-condition operation.

The abnormal operation threshold value 462 is used to judge whether or not the application program 122 set to the default is operated under an abnormal condition. The capacity consumption predicting unit 325 refers to the abnormal operation threshold value 462 in order to judge whether or not the application program 122 is operated under an abnormal condition.

For example, when the capacity consumption speed prediction value of the application program 122 is larger than the abnormal operation threshold value 462, the capacity consumption predicting unit 325 judges that the application program 122 is operated under an abnormal condition.

Even when a ratio of a short term prediction value of the capacity consumption speed of the application program 122 with respect to a long term prediction value of the capacity consumption speed of the application program 122 is larger than the abnormal operation threshold value 462, the capacity consumption predicting unit 325 judges that the application program 122 is operated under an abnormal condition. It should also be noted that the long term prediction value of the capacity consumption speed of the application program 122 is calculated based upon the used capacity 443 of the application capacity history data table 44 for past several days (long term). On the other hand, whereas the short term prediction value of the capacity consumption speed of the application program 122 is calculated based upon the used capacity 443 of the application capacity history data table 44 for past several hours (short term).

FIG. 11 is a configuration diagram of the application monitoring definition data table 47 stored in the management database 4 of the first embodiment of this invention.

The application monitoring definition data table 47 contains an application name 471, a priority 472, a write I/O limitation 473, a remaining operation time threshold value 474, and an abnormal operation threshold value 475.

The application name 471 is an identifier unique to the application program 122 executed by the application server 1. The priority 472 is a priority set for the application program 122 identified by the application name 471 of the record. The higher the priority set for the application program 122 is, the higher the operation of the remaining operation time threshold value 474 is guaranteed in the application program 122.

The write I/O limitation 473 indicates whether or not the write I/O from the application program 122 identified by the application name 471 of the record can be limited. When the write I/O can be limited, the write I/O limitation 473 also indicates a ratio of limiting the write I/O.

The remaining operation time threshold value 474 corresponds to a time during which the operation of the application program 122, which is identified by the application name 471 of the record, should be guaranteed. When the remaining operation time threshold value 474 indicates "default", instead of the remaining operation threshold value 474, the remaining operation time threshold value 461 of the storage pool monitoring definition data table 46 is used.

The abnormal operation threshold value 475 is used to judge whether or not the application program 122 identified by the application name 471 of the record is operated under an abnormal condition. When the abnormal operation threshold value 475 indicates "default", instead of the abnormal operation threshold value 475, the abnormal operation threshold value 462 of the storage pool monitoring definition data table 46 is used.

Figure 12:
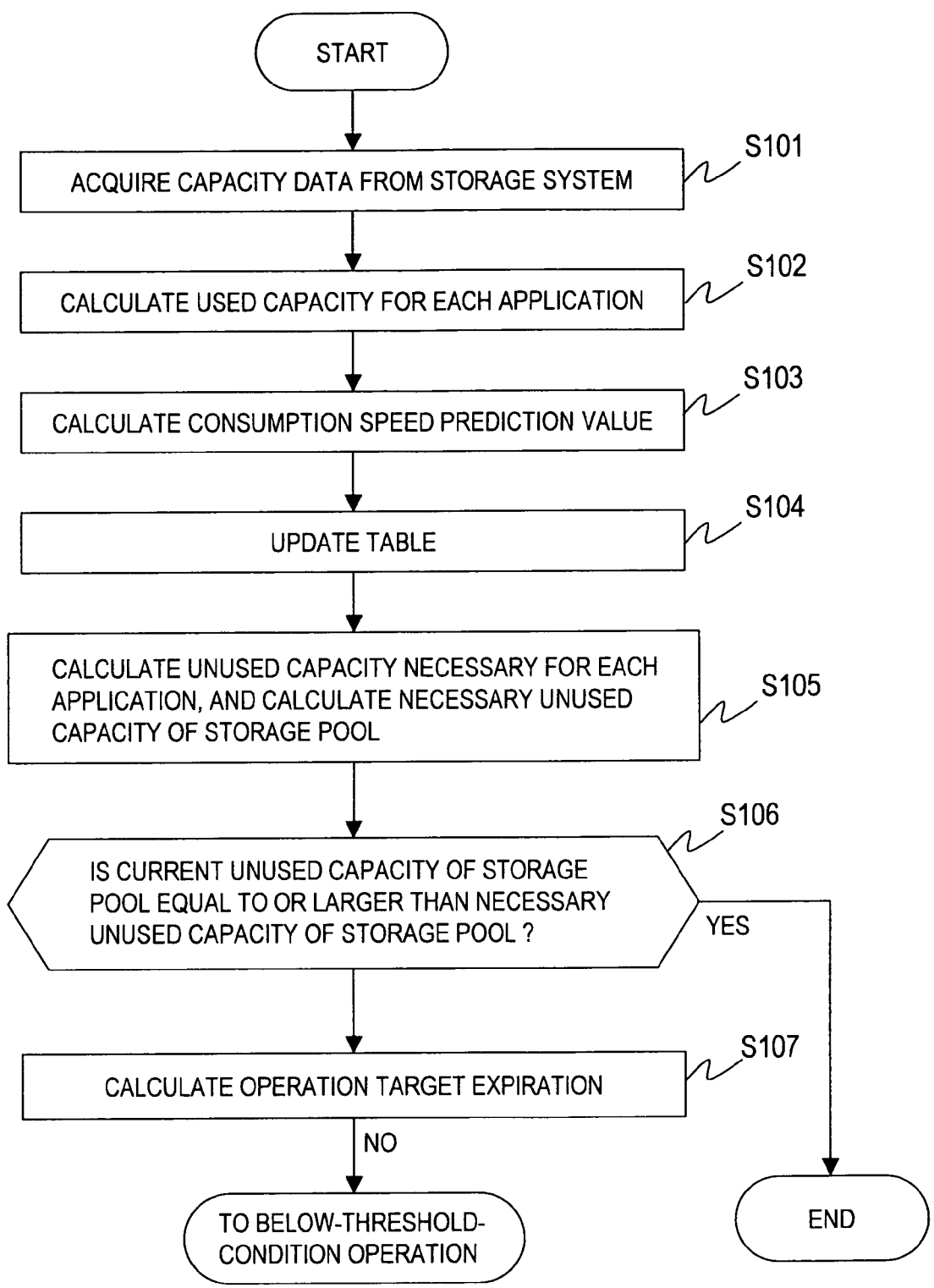
FIG. 12 is a flow chart of process operations of the management server during the normal operation according to the first embodiment of this invention.

FIG. 12 is a flow chart of process operations of the management server 3 during the normal operation according to the first embodiment of this invention.

During the normal operation, the management server 3 executes process operations during the normal operation in a predetermined time interval (for example, every 1 hour).

First, the management server 3 acquires current capacity data 27 from the storage system 2 (S101). It should be noted that the capacity data 27 contains the entire capacity of the storage pool 28, the used capacity of the storage pool 28, the unused capacity of the storage pool 28, the virtual capacity of the thin provisioning volume 29, and the used capacity of the thin provisioning volume 29.

Next, the management server 3 stores the acquired capacity data 27 in both the volume capacity history data table 43 and the storage pool capacity history data table 45.

Specifically, the management server 3 forms a new record in the volume capacity history data table 43. Next, the management server 3 stores a date/time when the capacity data 27 is acquired in the date/time 433 of the newly formed record. Next, the management server 3 stores the used capacity of the thin provisioning volume 29 contained in the acquired capacity data 27 in the used capacity 434 of the newly formed record.

Next, the management server 3 forms a new record in the storage pool capacity history data table 45. Next, the management server 3 stores the date/time when the capacity data 27 is acquired in date/time 452 of the newly formed record. Next, the management server 3 stores the used capacity of the storage pool 28 contained in the acquired capacity data 27 in the used capacity 453 of the newly formed record. Next, the management server 3 stores the unused capacity of the storage pool 28 contained in the acquired capacity data 27 in the unused capacity 454 of the newly formed record.

Next, the management server 3 calculates a used capacity of the application program 122 based upon the acquired capacity data 27 and the application management data table 41 (S102).

Specifically, the management server 3 sequentially selects all of the application programs 122. In this case, the management server 3 sequentially selects the records of the application management data table 41 in order from the top record. Next, the management server 3 extracts a used volume number 413 from the selected record. Then, the management server 3 extracts a used capacity of the thin provisioning volume 29 identified by the extracted used volume number 413 from the acquired capacity data. Next, the management server 3 totalizes the extracted used capacities of the thin provisioning volume 29 so as to calculate a used capacity of the application program 122.

Subsequently, the management server 3 stores the calculated used capacity of the application program 122 in the application capacity history data table 44.

Specifically, the management server 3 forms a new record in the application capacity history data table 44. Next, the management server 3 stores the date/time when the capacity data 27 is acquired in the date/time 442 of the newly formed record. Next, the management server 3 stores the calculated used capacity of the application program 122 in the used capacity 443 of the newly formed record.

Next, the management server 3 calculates a prediction value for the capacity consumption speed with respect to each of the application program 122, the thin provisioning volume 29, and the storage pool 28 (S103). Next, the management server 3 stores the calculated prediction values for the capacity consumption speeds in the volume capacity history data table 43, the application capacity history data table 44, and the storage pool capacity history data table 45. Thus, the management server 3 updates the volume capacity history data table 43, the application capacity history data table 44, and the storage pool capacity history data table 45 (S104).

Specifically, the management server 3 calculates a prediction value for the capacity consumption speed of the thin provisioning volume 29 based upon the used capacity 434 of the volume capacity history data table 43. Next, the management server 3 stores the calculated prediction value in the consumption speed prediction value 435 of the record newly formed in the volume capacity history data table 43.

Next, the management server 3 calculates a prediction value for the capacity consumption speed of the application program 122 based upon the used capacity 443 of the application capacity history data table 44. Next, the management server 3 stores the calculated prediction value in the consumption speed prediction value 444 of the application capacity history data table 44.

Next, the management server 3 calculates a prediction value for the capacity consumption speed of the storage pool 28 based upon either the used capacity 453 or the unused capacity 454 of the storage pool capacity history data table 45. Next, the management server 3 stores the calculated prediction value in the consumption speed prediction value 455 of the storage pool capacity history data table 45.

Next, the management server 3 calculates a necessary unused capacity with respect to each of the application programs 122. A necessary unused capacity of an application program 122 corresponds to a predicted storage capacity which is required for operating the application program 122 for a time duration equal to or longer than the remaining operation time threshold value 474 of the application monitoring definition data table 47.

Specifically, the management server 3 sequentially selects all of the application programs 122. Next, the management server 3 selects such a record that an identifier of the selected application program 122 matches the application name 441 from the application capacity history data table 44. Next, the management server 3 extracts the consumption speed prediction value 444 from the selected record.

Next, the management server 3 selects such a record that an identifier of the selected application program 122 matches the application name 471 from the application monitoring definition data table 47. Next, the management server 3 extracts the remaining operation time threshold value 474 from the selected record.

Next, the management server 3 multiplies the extracted consumption speed prediction value 444 by the extracted remaining operation time threshold value 474 so that a necessary unused capacity of the application program 122 is calculated. When the remaining operation time threshold value 474 indicates a default, the management server 3 multiplies the extracted consumption speed prediction value 444 by the remaining operation time threshold value 461 of the storage pool monitoring definition data table 46 so that a necessary unused capacity of the application program 122 is calculated.

The management server 3 sequentially selects all of the application programs 122 so as to calculate the necessary unused capacity of each of the application programs 122.

Next, the management server 3 totalizes all of the calculated necessary unused capacities for the respective application programs 122 so as to calculate a necessary unused capacity of the storage pool 28 (S105). The necessary unused capacity of the storage pool 28 corresponds to a predicted storage capacity which is required for all of the application programs 122 to operate for a time equal to or longer than the remaining operation time 474 of the application monitoring definition data table 47.

Next, the management server 3 selects a record indicating that the date/time 452 is the latest date/time from the storage pool capacity history data table 45. Then, the management server 3 extracts the unused capacity 454 from the selected record. Next, the management server 3 judges whether or not the extracted unused capacity 454 is equal to or larger than the calculated necessary unused capacity of the storage pool 28 (S106).

When the unused capacity 454 is equal to or larger than the necessary unused capacity of the storage pool 28, all of the application programs 122 can be operated for a time equal to or longer than the remaining operation time threshold value 474 of the application monitoring definition data table 47. Thus, the management server 3 ends the normal process operation under the normal condition.

On the other hand, when the unused capacity 454 is smaller than the necessary unused capacity of the storage pool 28, at least one of the application programs 122 cannot be operated for time up to the remaining operation time threshold value 474 of the application monitoring definition data table 47.

Thus, the management server 3 calculates an operation target expiration with respect to each of the application programs 122.

Specifically, the management server 3 sequentially selects all of the application programs 122. Next, the management server 3 selects such a record that an identifier of the selected application program 122 matches the application name 471 from the application monitoring definition data table 47. Next, the management server 3 extracts the remaining operation time threshold value 474 from the selected record. Then, the management server 3 adds the current date/time to the extracted remaining operation time threshold value 474 so as to calculate an operation target expiration of the selected application program 122.

It should be noted that when the remaining operations time threshold value 474 indicates a default, the current date/time is added to the remaining operation time threshold value 461 of the storage pool monitoring definition data table 46, thereby calculating the operation target expiration of the selected application program 122 (S107).

Next, the management server 3 selects such a record that an identifier of the selected application program 122 matches the application name 411 from the application management data table 41. Next, the management server 3 stores the calculated operation target expiration of the application program 122 in the operation target expiration 415 of the selected record.

Then, the management server 3 switches the operation under a normal condition to the below-threshold-condition operation.

Figure 13:
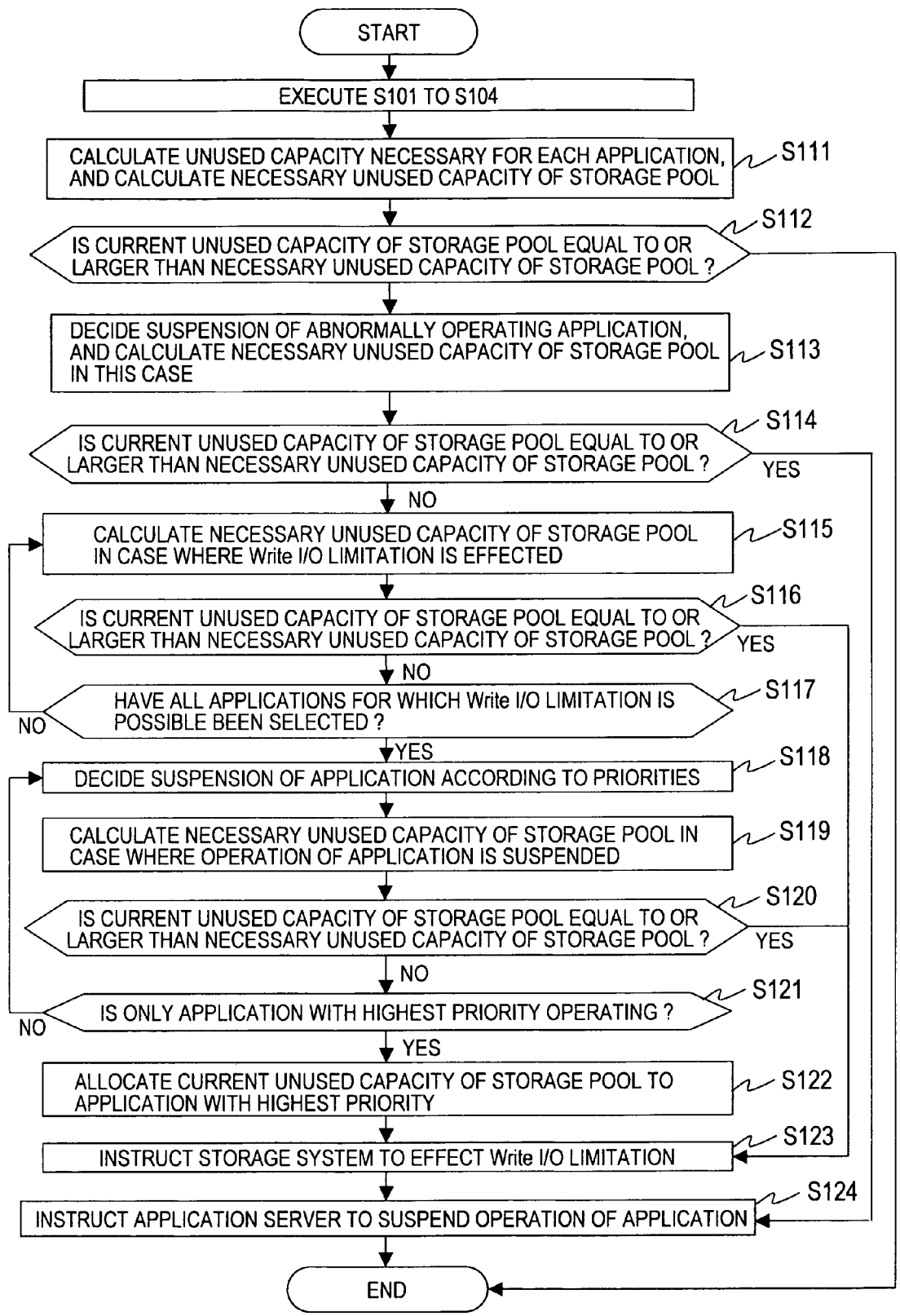
FIG. 13 is a flow chart of process operations of the management server in the below-threshold-condition operation, according to the first embodiment of this invention.

FIG. 13 is a flow chart of process operations of the management server 3 in the below-threshold-condition operation, according to the first embodiment of this invention.

In the below-threshold condition, the management server 3 executes the below-threshold-condition operation in a predetermined time interval (for example, every 1 hour).

First, the management server 3 executes the same process operations defined from Steps S101 to S104 in the operation under the normal condition.

Next, the management server 3 calculates a necessary unused capacity with respect to each of the application programs 122.

Specifically, the management server 3 sequentially selects all of the application programs 122. Next, the management server 3 selects such a record that an identifier of the selected application program 122 matches the application name 441 from the application capacity history data table 44. Next, the management server 3 extracts the consumption speed prediction value 444 from the selected record.

Next, the management server 3 selects such a record that an identifier of the selected application program 122 matches the application name 411 from the application management data table 41. Next, the management server 3 extracts an operation target expiration 415 from the selected record.

Next, the management sever 3 subtracts the current date/time from the extracted operation target expiration 415 so as to calculate an operation target time. Then, the management server 3 multiplies the extracted consumption speed prediction value 444 by the calculated operation target time so as to calculate a necessary unused capacity of the application program 122.

The management server 3 sequentially selects all of the application programs 122 so as to calculate a necessary unused capacity for each of the application programs 122.

Next, the management server 3 totalizes all of the calculated necessary unused capacities for the respective application programs 122 so as to calculate a necessary unused capacity of the storage pool 28 (S111).

Next, the management server 3 selects a record indicating that the date/time 452 is the latest date/time from the storage pool capacity history data table 45. Then, the management server 3 extracts the unused capacity 454 from the selected record. Next, the management server 3 judges whether or not the extracted unused capacity 454 is equal to or larger than the calculated necessary unused capacity of the storage pool 28 (S112).

When the unused capacity 454 is equal to or larger than the necessary unused capacity of the storage pool 28, all of the application programs 122 can be operated for a time up to the operation target expiration 415 of the application management data table 41. Thus, the management server 3 ends the process operations executed in the below-threshold-condition operation.

On the other hand, when the unused capacity 454 is smaller than the necessary unused capacity of the storage pool 28, at least one of the application programs 122 cannot be operated for time up to the operation target expiration 415 of the application management data table 41.

Accordingly, the management server 3 refers to the abnormal operation threshold value 462 of the storage pool monitoring definition data table 46 in order to specify an application program 122 which is operated under an abnormal condition among all of the application programs 122.

Specifically, the management server 3 sequentially selects the application programs 122. Next, the management server 3 selects such a record that an identifier of the selected application program 122 matches the application name 471 from the application monitoring definition data table 47. Next, the management server 3 extracts the abnormal operation threshold value 475 from the selected record. It should also be noted that when the extracted abnormal operation threshold value 475 indicates a default, instead of the abnormal operation threshold value 475, the abnormal operation threshold value 462 of the storage pool monitoring definition data table 46 is used.

Next, the management server 3 selects such a record that an identifier of the selected application program 122 matches the application name 441 from the application capacity history data table 44. Next, the management server 3 extracts the used capacity 443 and the consumption speed prediction value 444 from the selected record.

The management server 3 judges whether or not the extracted consumption speed prediction value 444 is larger than the abnormal operation threshold value 475. When the extracted consumption speed prediction value 444 is larger than the abnormal operation threshold value 475, the management server 3 judges that the selected application program 122 is operated under an abnormal condition.

Further, the management server 3 calculates both a long term prediction value and a short term prediction value as to a capacity consumption speed of the application program 122 based upon the used capacity 443. Next, the management server 3 judges whether or not a ratio of the calculated short term prediction value with respect to the calculated long term prediction value is larger than the abnormal operation threshold value 475. Even when the ratio of the short term prediction value with respect to the long term prediction value is larger than the abnormal operation threshold value 475, the management server 3 judges that the selected application program 122 is operated under an abnormal condition.

The management server 3 sequentially selects the application programs 122 to specify an application program 122 operated under an abnormal condition from among all of the application programs 122.

Next, the management server 3 determines to suspend the operation of the application program 122 under an abnormal condition. Then, the management server 3 calculates a necessary unused capacity of the storage pool 28 in the case where the operation of the application program 122 under an abnormal condition is suspended (S113).

Specifically, the management server 3 totalizes the necessary unused capacities of the application programs 122 except the application program 122 whose operation suspension is determined in order to calculate the necessary unused capacity of the storage pool 28.

Next, the management server 3 judges whether or not the unused capacity 454 extracted in Step S112 is equal to or larger than the necessary unused capacity of the storage pool 28 calculated in Step S113 (S114).

When the unused capacity 454 is equal to or larger than the necessary unused capacity of the storage pool 28, all of the application programs 122 that are not operated under an abnormal condition can be operated for a time up to the operation target expiration 415 of the application management data table 41. Then, the management server 3 advances to Step S124.

On the other hand, when the unused capacity 454 is smaller than the necessary unused capacity of the storage pool 28, at least one of the application programs 122 which are not operated under an abnormal condition cannot be operated for the time up to the operation target expiration 415 of the application management data table 41.

Thus, the management server 3 sequentially selects the application programs 122 whose write I/O can be limited in ascending order of priority.

Specifically, the management server 3 selects an application program 122 which has been set to a priority higher by 1 than the priority which has been set for the application program 122 selected in the previous Step S115 among the application programs 122 whose write I/O can be limited. It should also be noted that when executing Step S115 as a first case, the management server 3 selects an application program 122 which has been set to the lowest priority among the application programs 122 whose write I/O can be limited.

Next, the management server 3 determines to execute the write I/O limitation with respect to the selected application program 122.

Next, the management server 3 calculates a necessary unused capacity of the application program 122 when the write I/O limitation is executed.

For instance, a description is made of such a case that 20 percents of the write I/O is limited. In this case, the management server 3 multiplies the consumption speed prediction value 444 of the application capacity history data table 44 by "0.8(=1−0.2)". Next, the management server 3 multiplies the obtained value by the operation target time calculated in Step S111 in order to calculate a necessary unused capacity of the application program 122 when the write I/O limitation is carried out.

Next, the management server 3 calculates a necessary unused capacity of the storage pool 28 in the case where the write I/O limitation is carried out based upon the calculated necessary unused capacity of the application program 122 (S115).

Next, the management server 3 judges whether or not the unused capacity 454 extracted in Step S112 is equal to or larger than the necessary unused capacity of the storage pool 28 calculated in Step S115 (S116)

When the unused capacity 454 is equal to or larger than the necessary unused capacity of the storage pool 28, all of the application programs 122 which are not operated under an abnormal condition can be operated for a time up to the operation target expiration 415 of the application management data table 41. Then, the management server 3 advances to Step S123.

On the other hand, when the unused capacity 454 is smaller than the necessary unused capacity of the storage pool 28, at least one of the application programs 122 which are not operated under an abnormal condition cannot be operated for the time up to the operation target expiration 415 of the application management data table 41.

Thus, the management server 3 judges whether or not all of the application programs 122 whose write I/O can be limited have been selected in Step S115 (S117).

When any one of the application programs 122 whose write I/O can be limited has not yet selected, the management server 3 returns to Step S115.

On the other hand, when all of the application programs 122 whose write I/O can be limited are selected, even if the write I/O is limited, at least one application program 122 cannot be operated for a time up to the operation target expiration 415 of the application management data table 41.

Thus, the management server 3 sequentially selects the application programs 122 in ascending order of priority.

Specifically, the management server 3 selects an application program 122 which has been set to a priority higher by 1 than the priority which has been set for the application program 122 selected in the previous Step S118 from among the application programs 122 that are not operated under an abnormal condition. It should also be noted that when the management server 3 executes Step S118 as a first case, the management server 3 selects an application program 122 which has been set to the lowest priority.

Next, the management server 3 determines to suspend the operation of the selected application program 122 (S118). Next, the management server 3 calculates a necessary unused capacity of the storage pool 28 in the case where the operation of the application program 122 whose operation suspension is determined is suspended (S119).

Specifically, the management server 3 totalizes the necessary unused capacities of the application programs 122 except the application program 122 whose operation suspension is determined in order to calculate the necessary unused capacity of the storage pool 28.

Next, the management server 3 judges whether or not the unused capacity 454 extracted in Step S112 is equal to or larger than the necessary unused capacity of the storage pool 28 calculated in Step S118 (S120)

When the unused capacity 454 is equal to or larger than the necessary unused capacity of the storage pool 28, all of the application programs 122 that are not operated under an abnormal condition can be operated for a time up to the operation target expiration 415 of the application management data table 41. Then, the management server 3 advances to Step S123.

On the other hand, when the unused capacity 454 is smaller than the necessary unused capacity of the storage pool 28, at least one of the application programs 122 whose operation suspension is not determined cannot be operated for the time up to the operation target expiration 415 of the application management data table 41.

Accordingly, the management server 3 judges whether or not all of the application programs 122 except an application program 122 which has been set to the highest priority in Step S118 has been selected (S121).

When any one of the application programs 122 except the application program 122 set to the highest priority is not selected, the management server 3 returns to Step S118.

On the other hand, when all of these application programs 122 except the application program 122 set to the highest priority are selected, even the application program 122 which has been set to the highest priority cannot be operated for the time up to the operation target expiration 415 of the application management data table 41.

Thus, the management server 3 distributes the unused capacity of the storage pool 28 to the application program 122 which has been set to the highest priority (S122).

First, the management server 3 calculates a necessary unused capacity with respect to each of the application programs 122 set to the highest priority.

Specifically, the manager server 3 sequentially selects the application programs 122 which have been set to the highest priority. Next, the management server 3 selects such a record that an identifier of the selected application program 122 matches the application name 441 from the application capacity history data table 44. Next, the management server 3 extracts the consumption speed prediction value 444 from the selected record.

Next, the management server 3 selects such a record that an identifier of the selected application program 122 matches the application name 411 from the application management data table 41. Next, the management server 3 extracts the operation target expiration 415 from the selected record.

Next, the management server 3 subtracts the current date/time from the extracted operation target expiration 415 so as to calculate an operation target time. Next, the management server 3 multiplies the extracted consumption speed prediction value 444 by the calculated operation target time so as to calculate a necessary unused capacity of the application program 122 which has been set to the highest priority.

The management server 3 sequentially selects all of the application programs 122 that have been set to the highest priority in order to calculate a necessary unused capacity for each of the application programs 122 set to the highest priority.

Next, the management server 3 distributes the unused capacity 454 extracted in Step S112 to the application program 122 which has been set to the highest priority based upon the necessary unused capacity for each of the calculated application programs 122. For example, the management server 3 distributes the unused capacity 454 extracted in Step S112 to the application program 122 according to a ratio of the necessary unused capacities for the respective calculated application programs 122.

Thus, the management server 3 calculates an unused allocation capacity for each of the application programs 122 set to the highest priority. An unused allocation capacity of the application program 122 corresponds to a capacity distributed to the application program 122 within the unused capacity of the storage pool 28.

Next, the management server 3 calculates an operable prediction expiration for each of the application programs 122

Specifically, the management server 3 divides the calculated unused allocation capacity of the application program 122 by the extracted consumption speed prediction value 444 so as to calculate an operable prediction time of the application program 122. It should also be noted that an operable prediction time corresponds to a time period during which the application program 122 can be operated. Next, the management server 3 adds the current date/time to the calculated operable prediction time of the application program 122 in order to calculate an operable prediction expiration of the application program 122.

Then, the management server 3 stores both the calculated unused allocation capacity of the application program 122 and the calculated operable prediction expiration of the application program 122 in the application management data table 41.

Specifically, the management server 3 selects such a record that an identifier of the application program 122 from which both the unused allocation capacity and the operable prediction expiration are calculated matches the application name 411 from the application management data table 41. Next, the management server 3 stores the calculated unused allocation capacity of the application program 122 in the unused allocation capacity 417 of the selected record. Next, the management server 3 stores the calculated operable prediction expiration of the application program 122 in the operable prediction expiration 416 of the selected record.

Next, the management server 3 specifies a thin provisioning volume 29 used by the application program 122 in which the execution of the write I/O limitation is determined in Step S115. Next, the management server 3 instructs the storage system 2 to execute the write I/O limitation with respect to the specified thin provisioning volume 29 (S123).

Specifically, the management server 3 selects such a record that an identifier of the application program 122 in which the execution of the write I/O limitation is determined matches the application name 411 from the application management data table 41. Next, the management server 3 stores "I/O-limited" in the operation status 414 of the selected record. Then, the management server 3 extracts the used volume number 413 from the selected record. Next, the management server 3 instructs the storage system 2 to execute the write I/O limitation with respect to the thin provisioning volume 29 which is identified by the extracted used volume number 413.

As a result, the storage system 2 executes the write I/O limitation with respect to the thin provisioning volume 29 in response to the instruction issued from the management server 3.

On the other hand, the management server 3 selects such a record that an identifier of the application program 122 in which the operation suspension is determined in Steps S113 and S118 matches the application name 411 from the application management data table 41. Next, the management server 3 stores "suspended" in the operation status 414 of the selected record. Further, the management server 3 instructs the application management agent 123 provided in the application server 1 to suspend the operation of the application program 122 whose operation suspension is determined in Steps S113 and S118 (S124).

Then, the management server 3 ends the process operation of the below-threshold-condition operation.

As a result, the application management agent 123 provided in the application server 1 suspends the operation of the application program 122 in correspondence with the instruction issued from the management server 3.

It should also be noted that when a storage resource such as the LU 25 is additionally provided to the storage pool 28, the management server 3 switches the below-threshold-condition operation to the operation under a normal condition.

As described above, the management server 3 monitors the capacity of the storage pool 28 during the normal operation while the entire portion of the storage pool 28 is defined as the unit. Then, the management server 3 judges whether or not the capacity of the storage pool 28 is the sufficiently large capacity. When the unused capacity of the storage pool 28 is not the sufficiently large capacity, the storage server 3 switches the operation under a normal condition to the below-threshold-condition operation.

In the below-threshold-condition operation, the management server 3 monitors the capacity of the storage pool 28 while the application program 122 running on the application server 1 is defined as the unit. When the capacity of the storage pool 28 is not a sufficiently large capacity, the management server 3 executes at least one of the suspended operation of the application program 122 operated under an abnormal condition, the write I/O limitation thereof, and the suspended operation of the application program 122 set to the low priority. As a result, the application program 122 set to the high priority can be operated for the time up to the operation target expiration.

Also, even when those operations are executed, when the application program 122 set to the high priority cannot be operated for the time up to the operation target expiration, the management server 3 distributes the unused capacity of the storage pool 28 to the application program 122 set to the highest priority.

Second Embodiment

In a second embodiment of this invention, the management server 3 calculates a necessary unused capacity of the storage pool 28 based upon a consumption speed prediction value of the storage pool 28.

Since a configuration of a computer system of the second embodiment is identical to the configuration (FIG. 1) of the computer system of the first embodiment, explanations thereof are omitted. Also, since a below-threshold-condition operation of the computer system according to the second embodiment is identical to the below-threshold-condition operation (FIG. 13) of the computer system according to the first embodiment, explanations thereof are omitted.

Figure 14:
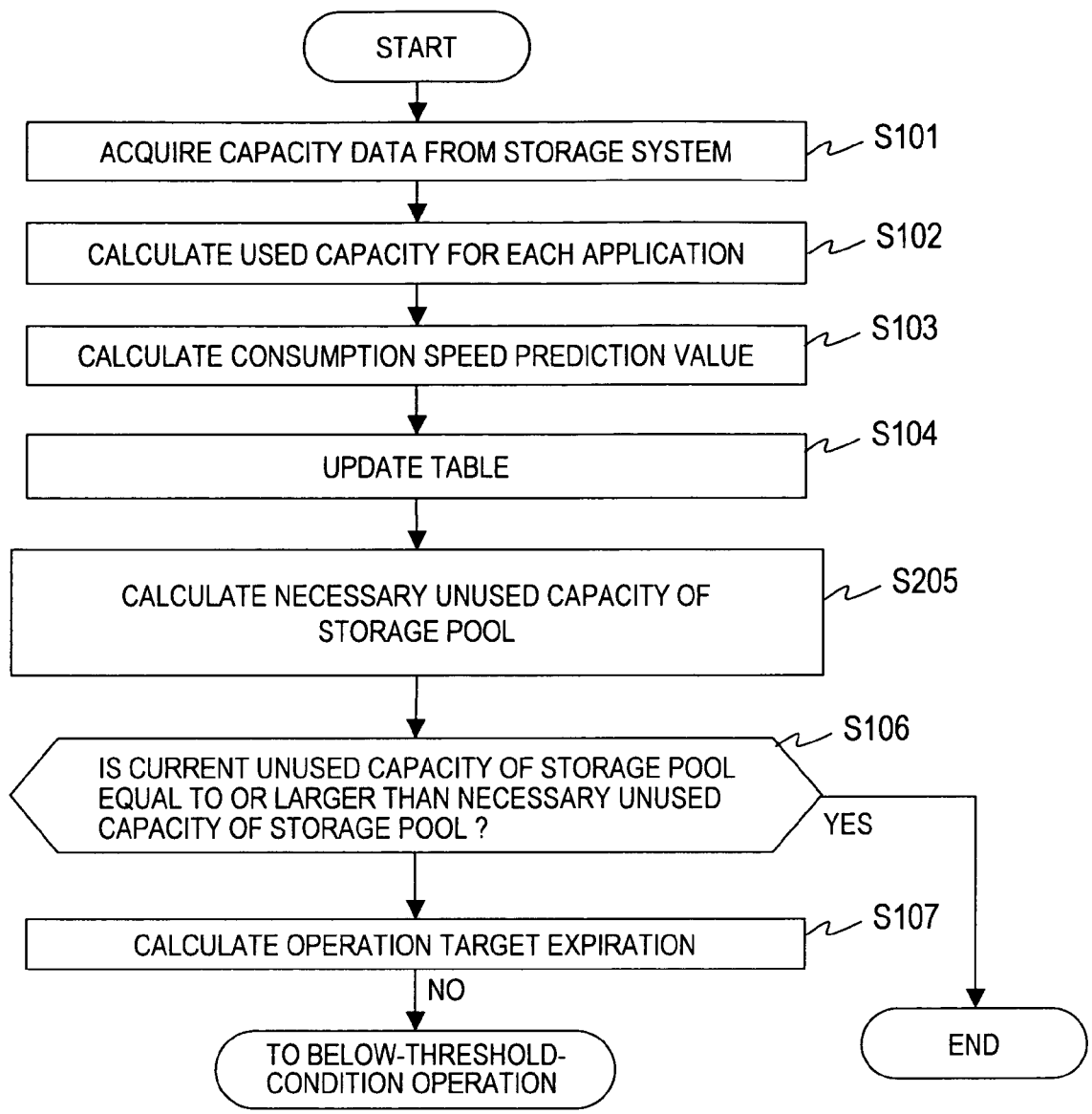
FIG. 14 is a flow chart for explaining process operations as to an operation under a normal condition of the management server according to the second embodiment of this invention.

FIG. 14 is a flow chart for explaining process operations as to an operation under a normal condition of the management server 3 according to the second embodiment of this invention.

The process operation under a normal condition of the management server 3 according to the second embodiment of this invention includes Steps S205 instead of S105. Since steps other than Step S205 described above are identical to those included in the process operation under a normal condition (FIG. 12) of the management server 3 according to the first embodiment of this invention, explanations thereof are omitted.

Upon completion of the process operation of Step S104, the management server 3 selects such a record indicating that the date/time 452 is the latest date/time from the storage pool capacity history data table 45. Next, the management server 3 extracts the consumption speed prediction value 455 from the selected record.

Next, the management server 3 extracts the remaining operation time threshold value 461 from the storage pool monitoring definition data table 46. Next, the management server 3 multiplies the extracted consumption speed prediction value 455 by the extracted remaining time threshold value 461 so as to calculate a necessary unused capacity of the storage pool 28 (S205). Then, the management server 3 advances to Step S106.

As described above, according to the second embodiment, the management server 3 can calculate the necessary unused capacity of the storage pool 28 without calculating a necessary unused capacity for each of the application programs 122.

Third Embodiment

In a third embodiment of this invention, when a capacity of the storage pool 28 is not a sufficiently large capacity, the management server 3 distributes an unused capacity of the storage pool 28 to the application program 122.

Since a configuration of a computer system of the third embodiment is identical to the configuration (FIG. 1) of the computer system of the first embodiment, explanations thereof are omitted.

Figure 15:
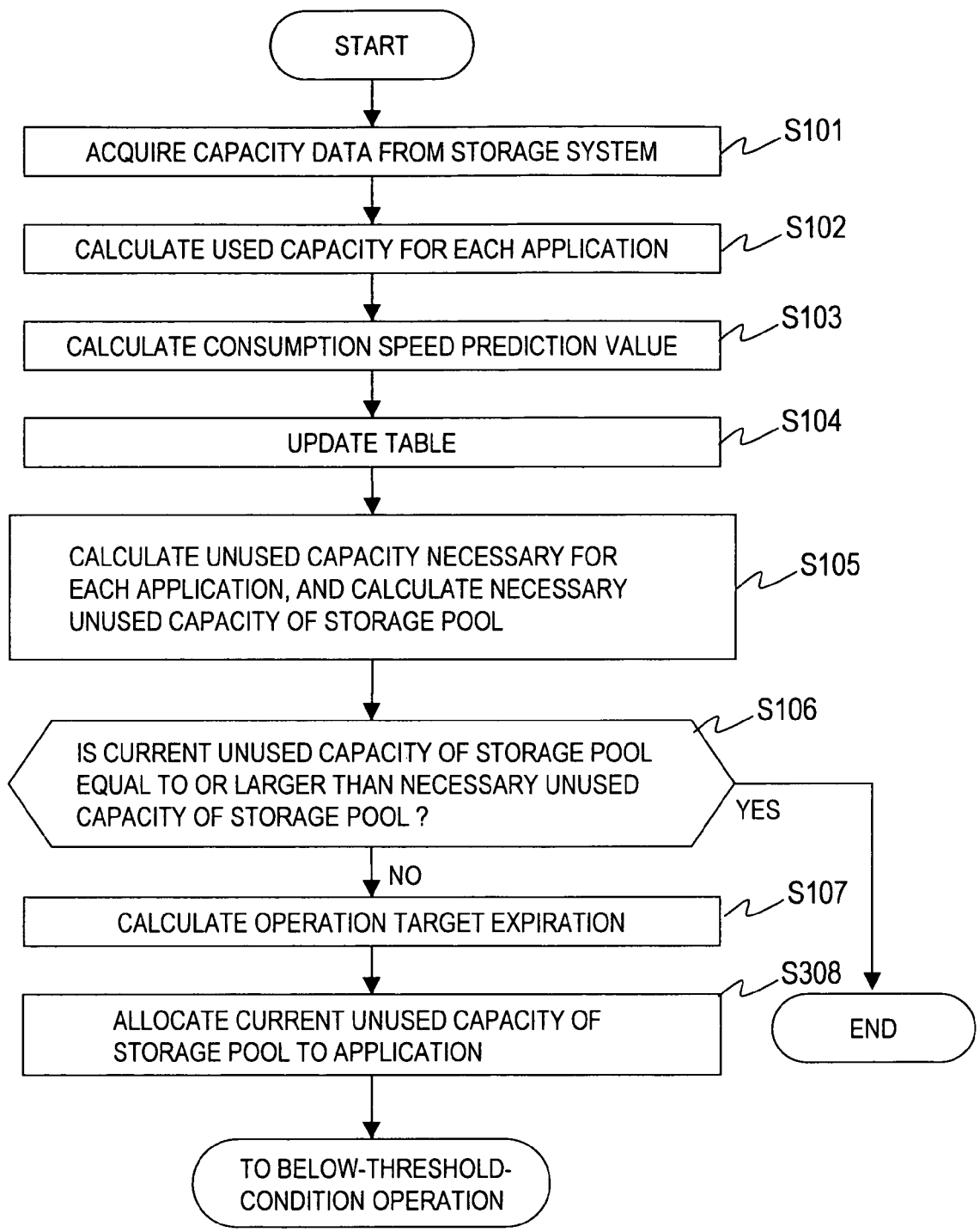
FIG. 15 is a flow chart of process operations under a normal condition of the management server according to the third embodiment of this invention.

FIG. 15 is a flow chart of process operations under a normal condition of the management server 3 according to the third embodiment of this invention.

The process operation under a normal condition of the management server 3 according to the third embodiment of this invention includes Step S308. Since steps other than S308 described above are identical to those included in the process operation under a normal condition (FIG. 12) of the management server 3 according to the first embodiment, explanations thereof are omitted.

Upon completion of the process operation of Step S107, the management server 3 distributes an unused capacity of the storage pool 28 to the application program 122 (S308).

First, the management server 3 calculates a necessary unused capacity for each of the application programs 122.

Specifically, the management server 3 sequentially selects all of the application programs 122. Next, the management server 3 selects such a record that an identifier of the selected application program 122 matches the application name 441 from the application capacity history data table 44. Next, the management server 3 extracts the consumption speed prediction value 444 from the selected record.

Next, the management server 3 selects such a record that an identifier of the selected application program 122 matches the application name 411 from the application management data table 41. Next, the management server 3 extracts the operation target expiration 415 from the selected record.

Next, the management server 3 subtracts the current date/time from the extracted operation target expiration 415 so as to calculate an operation target time. Next, the management server 3 multiplies the extracted consumption speed prediction value 444 by the calculated operation target time so as to calculate a necessary unused capacity of the selected application program 122.

The management server 3 sequentially selects all of the application programs 122 so as to calculate a necessary unused capacity for each of the application programs 122.

Next, the management server 3 selects a record indicating that the date/time 452 is the latest date/time from the storage pool capacity history data table 45. Next, the management server 3 extracts an unused capacity 454 from the selected record.

Next, the management sever 3 distributes the extracted unused capacity 454 to the application program 122 based upon the calculated unused capacity for each of the calculated application programs 122. For instance, the management server 3 distributes the extracted unused capacity 454 to the application program 122 according to a ratio of the calculated necessary unused capacities for the respective application programs 122.

Then, the management server 3 stores the calculated unused allocation capacity of the application program 122 in the application management data table 41.

Specifically, the management server 3 selects such a record that an identifier of the application program 122 from which the unused allocation capacity is calculated matches the application name 411 from the application management data table 41. Next, the management server 3 stores the calculated unused allocation capacity of the application program 122 in the unused allocation capacity 417 of the selected record.

Then, the management sever 3 switches the operation under a normal condition to the below-threshold-condition operation.

Figure 16:
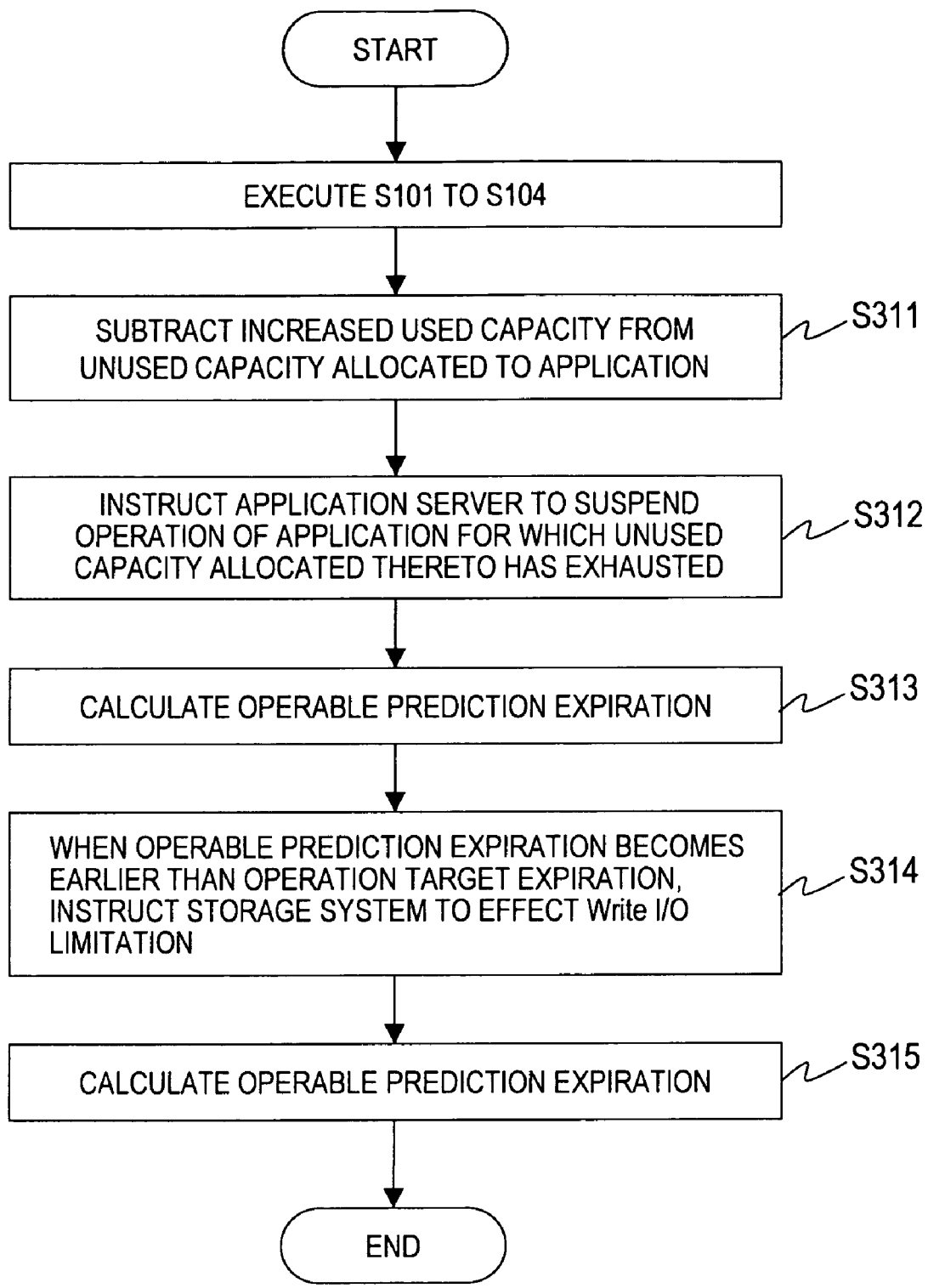
FIG. 16 is a flow chart of process operations of the management server in the below-threshold-condition operation, according to the third embodiment of this invention.

FIG. 16 is a flow chart of process operations of the management server 3 in the below-threshold-condition operation, according to the third embodiment of this invention.

In the below-threshold condition, the management server 3 executes the below-threshold-condition operation in a predetermined time interval (for example, every 1 hour).

First, the management server 3 executes the same process operations defined from Steps S101 to S104 in the operation under the normal condition.

Next, the management server 3 calculates a current unused allocation capacity with respect to each of the application programs 122.

Specifically, the management server 3 sequentially selects all of the application programs 122. Next, the management server 3 calculates an increased capacity of the used capacity of the selected application program 122. It should be noted that an increased capacity of the used capacity of the application program 122 corresponds to a capacity within the used capacity of the application program 122, which is increased between the time (preceding time) when the process operation for the previous below-threshold-condition operation is carried out and the current time.

Thus, the management server 3 subtracts the used amount of the application program 122 at the time when the process operation for the previous below-threshold-condition operation from the current used capacity of the application program 122 so as to calculate an increased capacity of the used capacity of the application program 122.

Next, the management server 3 selects such a record that an identifier of the selected application program 122 matches the application name 441 from the application management data table 41. Next, the management server 3 subtracts the calculated increased capacity of the used capacity from the unused allocation capacity 417 of the selected record (S311). Thus, the management server 3 calculates a current unused allocation capacity of the selected application program 122.

The management server 3 sequentially selects all of the application programs 122 so as to calculate a current unused allocation capacity for each of the application programs 122.

Next, the management server 3 judges whether or not such an application program 122 whose unused allocation capacity is exhausted is present.

When the application program 122 whose unused allocation capacity is exhausted is present, the management server 3 instructs the application management agent 123 provided in the application server 1 to suspend the operation of such an application program 122 whose unused allocation capacity is exhausted (S312).

Specifically, the management server 3 selects such a record that a value equal to or smaller than "0" has been stored in the unused allocation capacity 417 from the application management data table 41. Next, the management server 3 stores "suspended" to the operation status 414 of the selected record. Further, the management server 3 extracts the application name 411 from the selected record. Next, the management server 3 instructs the application management agent 123 provided in the application server 1 to suspend the operation of the application program 122 identified by the extracted application name 411.

As a result, the application management agent 123 provided in the application server 1 suspends the operation of the application program 122 in response to the instruction from the management server 3.

On the other hand, the management server 3 calculates an operable prediction expiration for each of the application programs 122 (S313).

Specifically, the management server 3 sequentially selects the records of the application management data table 41 from the upper record. Next, the management server 3 extracts both the application name 411 and the unused allocation capacity 417 from the selected record.

Next, the management server 3 selects such a record that the extracted application name 411 matches the application name 441 from the application capacity history data table 44. Next, the management server 3 selects such a record whose date/time 442 is the latest date/time from the selected record. Then, the management server 3 extracts the consumption speed prediction value 444 from the selected record.

Next, the management sever 3 divides the extracted unused allocation capacity 417 by the extracted consumption speed prediction value 444 so as to calculate an operable prediction time of the application program 122. Next, the management server 3 adds the current date/time to the calculated operable prediction time of the application program 122 to calculate an operable prediction expiration of the application program 122.

Then, the management server 3 stores the calculated operable prediction expiration of the application program 122 in the operable prediction expiration 416 of the record selected from the application management data table 41.

The management server 3 repeats the process operation until all of the records of the application management data table 41 are selected. As a result, the management server 3 calculates an operable prediction expiration for each of the application programs 122.

Next, the management server 3 judges whether or not such an application is present, the operable prediction expiration of which becomes earlier than the operation target expiration. When such an application is present the operable prediction expiration of which becomes earlier than the operation target expiration, the management server 3 instructs the storage system 2 to execute the write I/O limitation (S314).

Specifically, the management server 3 sequentially selects the records of the application management data table 41 from the upper record. Next, the management server 3 extracts a used volume number 413, an operation target expiration 415, and an operable prediction expiration 416 from the selected record.

Next, the management server 3 judges whether or not the extracted operable prediction expiration 416 is earlier than the extracted operation target expiration 415. When the extracted operable prediction expiration 416 is earlier than the extracted operation target expiration 415, the management server 3 instructs the storage system 2 to execute the write I/O limitation with respect to the thin provisioning volume 29 which is identified by the extracted used volume number 413. Further, the management server 3 stores "I/O-limited" into the operation status 414 of the selected record.

As a result, the storage system 2 executes the write I/O limitation with respect to the thin provisioning volume 29 in response to the instruction from the management server 3.

On the other hand, the management server 3 calculates an operable prediction expiration of the application program 122 after the write I/O limitation has been carried out (S315).

For instance, a description is made of such a case that 20 percents of the write I/O is limited. In this case, the management server 3 multiplies the consumption speed prediction value 444 of the application capacity history data table 44 by "0.8(=1−0.2)." As a result, the management server 3 calculates the consumption speed prediction value after the write I/O limitation is carried out. Next, the management server 3 divides the unused allocation capacity 417 of the application management data table 41 by the consumption speed prediction value after the write I/O limitation is carried out. As a result, the management server 3 calculates an operable prediction time after the write I/O limitation is carried out. Next, the management server 3 adds the current date/time to the operable prediction time after the write I/O limitation is carried out. As a result, the management server 3 calculates the operable prediction expiration after the write I/O limitation has been carried out.

Next, the management server 3 stores the calculated operable prediction expiration after the write I/O limitation is carried out into the operable prediction expiration 416 of the application management data table 41.

Then, the management server 3 accomplishes the process operation of the below-threshold-condition operation.

It should also be noted that when a storage resource such as the LU 25 is additionally provided with the storage pool 28, the management server 3 switches the below-threshold-condition operation to the operation under a normal condition.

As described above, in accordance with the third embodiment, when the capacity of the storage pool 28 becomes not a sufficiently large capacity, the management server 3 distributes the unused capacity of the storage pool 28 to the application programs 122. Thus, even when a certain application program 122 is operated under an abnormal condition, other application programs 122 are not affected.

Also, in the third embodiment, the management server 3 performs the write I/O limitation with respect to an application program 122 which is predicted to be unable to operate until the operation target expiration.

Fourth Embodiment

In a fourth embodiment of this invention, the storage system 2 provides not the thin provisioning volume 29, but the logical volume (LU) 25 to the application server 1.

Figure 17:
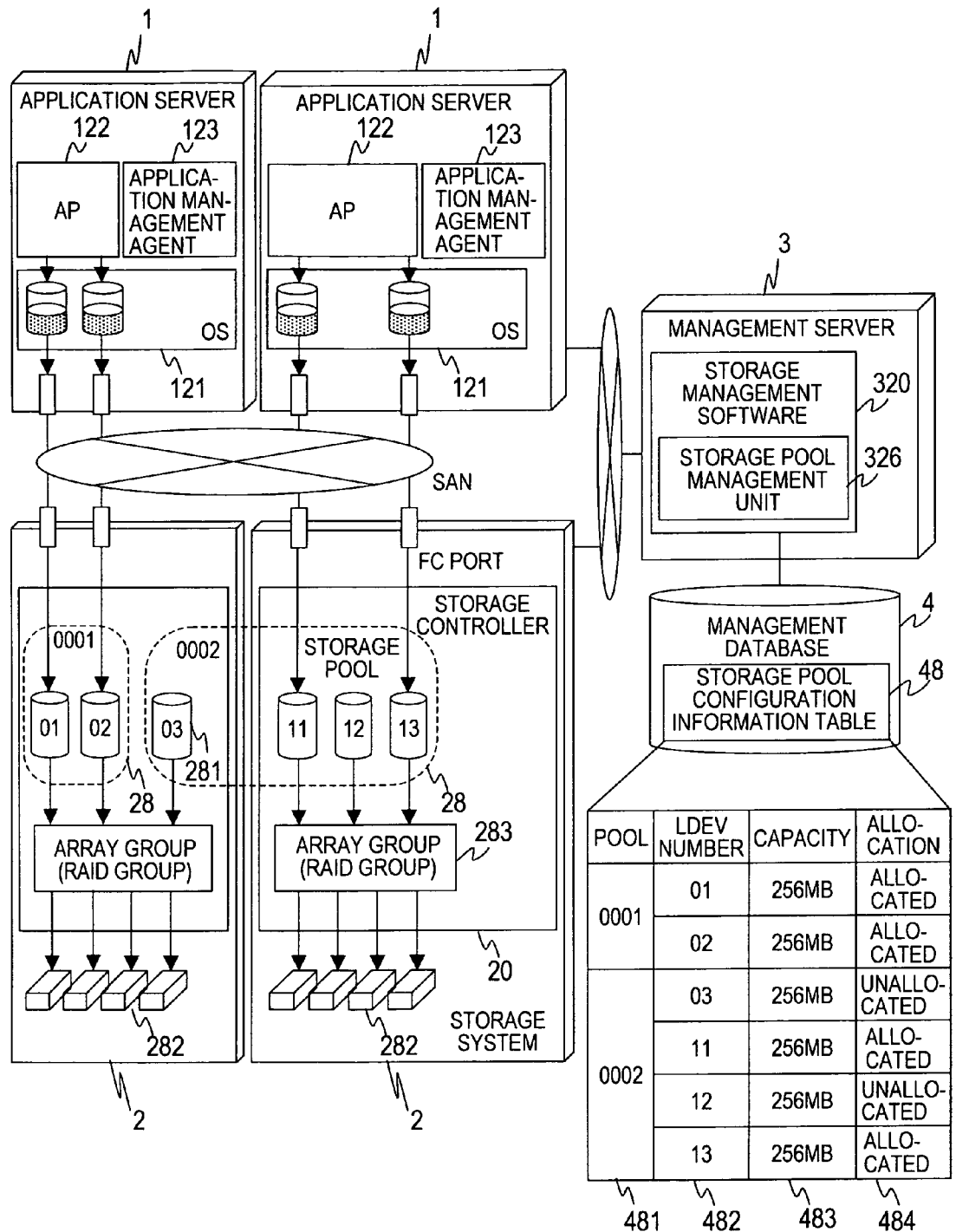
FIG. 17 is a diagram of a configuration of a computer system according to the fourth embodiment of this invention.

FIG. 17 is a diagram of a configuration of a computer system according to the fourth embodiment of this invention.

The computer system is equipped with two application servers 1, two storage systems 2, a management server 3, a management database 4, a management local area network (LAN) 5, and a storage area network (SAN) 6.

It should be noted that since the application server 1 is identical to that provided in the computer system (FIG. 1) of the first embodiment, explanations thereof are omitted.

The storage system 2 is equipped with a storage controller 20 and physical disks 282.

The storage controller 20 reads/writes data from/to the physical disks 282. The storage controller 20 sets one or more physical disks 282 in an array group (RAID group) 283. As a result, the storage controller 20 sets storage areas of the physical disks 282 as one or more logical devices (LDEV) 281.

Storage management software 320 provided in the management server 3 contains a storage pool monitoring unit 321, a storage management data acquiring unit 322, a storage system control unit 323, an application program control unit 324, and a capacity consumption predicting unit 325, and a storage pool managing unit 326. It should be noted that since the storage pool monitoring unit 321, the storage management data acquiring unit 322, the storage system control unit 323, the application program control unit 324, and the capacity consumption predicting unit 325 are identical to those contained in the storage management software 320 provided in the management server 3 (FIG. 3) of the first embodiment, explanations thereof are omitted.

The storage pool managing unit 326 manages a storage pool 28 which contains one or more LDEVs 281. In other words, the storage pool managing unit 326 sets the storage areas of the LDEVs 281 as the storage pool 28. It should also be noted that the storage pool managing unit 326 may alternatively manage a plurality of storage pools 28. Further, the storage pool managing unit 326 may alternatively set LDEVs 281 which are contained in the different storage systems 2 as a single storage pool 28.

The storage pool managing unit 326 instructs the storage controller 20 provided in the storage system 2 to allocate the LDEVs 281 contained in the storage pool 28 to the logical volumes (LUs) 25.

The storage controller 20 provided in the storage system 2 allocates the LDEVs 281 contained in the storage pool 28 to the LUs 25 in response to the instruction from the storage pool managing unit 326. Then, the storage controller 20 provides the LU 25 to which one or more LDEVs 281 are allocated to the application server 1.

An OS (operating system) 121 provided in the application server 1 provides the provided LUs 25 as an unified device to the application program 122. As a result, the application program 122 provided in the application server 1 accesses the LU 25 of the storage system 2 by using the provided unified device.

At this time, the OS 121 provided in the application server 1 may properly switch paths used to access the LUs 25. As a result, the OS 121 can realize both a load balance function and a path replacement function, while giving no attention to the application program 122. In other words, the application program 122 may access the LU 25 by employing the proper path by merely issuing an I/O to the unified device.

The management database 4 stores therein an application management data table 41, a storage management data table 42, a volume capacity history data table 43, an application capacity history data table 44, a storage pool capacity history data table 45, a storage pool monitoring definition data table 46, an application monitoring definition data table 47, and a storage pool configuration information table 48.

It should also be noted that since the application management data table 41, the storage management data table 42, the volume capacity history data table 43, the application capacity history data table 44, the storage pool capacity history data table 45, the storage pool monitoring definition data table 46, and the application monitoring definition data table 47 are identical to those stored in the management database 4 (FIG. 4) of the first embodiment, explanations thereof are omitted.

The storage pool configuration information table 48 contains a pool number 481, an LDEV number 482, a capacity 483, and an allocation 484.

The pool number 481 is an identifier unique to the storage pool 28. The LDEV number 482 is an identifier unique to an LDEV 281 contained in the storage pool 28 identified by the pool number 481 of the record. The capacity 483 is a capacity of a storage area of the LDEV 281 identified by the LDEV number 482 of the record.

The allocation 484 indicates whether or not the LDEV 281 identified by the LDEV number 482 of the record has been allocated to the LU 25. For example, when the LDEV 281 identified by the LDEV number 482 of the record has been allocated to the LU 25, "allocated" is stored in the allocation 484. On the other hand, when the LDEV 281 identified by the LDEV number 482 of the record has not yet been allocated to the LU 25, "unallocated" is stored in the allocation 484.

When the capacity of the LU 25 becomes short, the storage pool managing unit 326 allocates an LDEV 281 which has not yet been allocated to any of the logical volumes 25 among the LDEVs 281 contained in the storage pool 28 to the LU 25 whose capacity becomes short. Thus, the storage controller 20 increases the capacity of the LU 25 which becomes short.

Specifically, when the capacity of the LU 25 becomes short, the storage pool managing unit 326 selects such a record that "unallocated" has been stored in the allocation 484 from the storage pool configuration information table 48. Next, the storage pool managing unit 326 extracts the LDEV number 482 from the selected record. Next, the storage pool managing unit 326 allocates the LDEV 281 identified by the extracted LDEV number 482 to the LU 25 whose capacity becomes short.

When the capacity of the LU 25 becomes short, the storage pool managing unit 326 may alternatively provide an LDEV 281 which has not yet been allocated to any of the LUs 25 among the LDEVs 281 contained in the storage pool 28 to the application server 1 as a new LU 25.

The computer system of the fourth embodiment may be applied to any of the first to third embodiments. It should also be noted that in the fourth embodiment, the thin provisioning volume 29 is replaced by the LU 25. Also, a used capacity of the LU 25 corresponds to a total capacity as to the LDEVs 281 allocated to the LU 25.

Also, in the fourth embodiment, the management server 3 prohibits that the LDEV 281 is additionally allocated to the LU 25 used by the application program 221 instead of suspension of the operation of the application program 221.

Other process operations of the computer system of the fourth embodiment are performed in a similar manner to those of the first to third embodiments. Therefore, detailed explanations are omitted.

As described above, according to the fourth embodiment, even when the storage system 2 provides not the thin provisioning volume 29, but the logical volume (LU) 25, the management server 3 can properly operate and manage the storage pools.

Fifth Embodiment

In a fifth embodiment of this invention, when a capacity of the storage pool 28 does not become a sufficiently large capacity, the LDEV 281 is added to the storage pool 28 in an on-demand mode.

It should also be noted that since a configuration of a computer system of the fifth embodiment is identical to the arrangement (FIG. 17) of the computer system of the fourth embodiment, explanations thereof are omitted.

The computer system of the fifth embodiment may be applied to any of the first to third embodiments. It should also be noted that in the fifth embodiment, the thin provisioning volume 29 is replaced by the LU 25. Also, a used capacity of the LU 25 corresponds to a total capacity as to the LDEVs 281 allocated to the LU 25.

Also, in the fifth embodiment, the management server 3 prohibits that the LDEV 281 is additionally allocated to the LU 25 used by the application program 221 instead of suspension of the operation of the application program 221.

A below-threshold-condition operation of the computer system according to the fifth embodiment is performed in a similar manner as in the first to third embodiments. Accordingly, a detailed description thereof is omitted.

Figure 18:
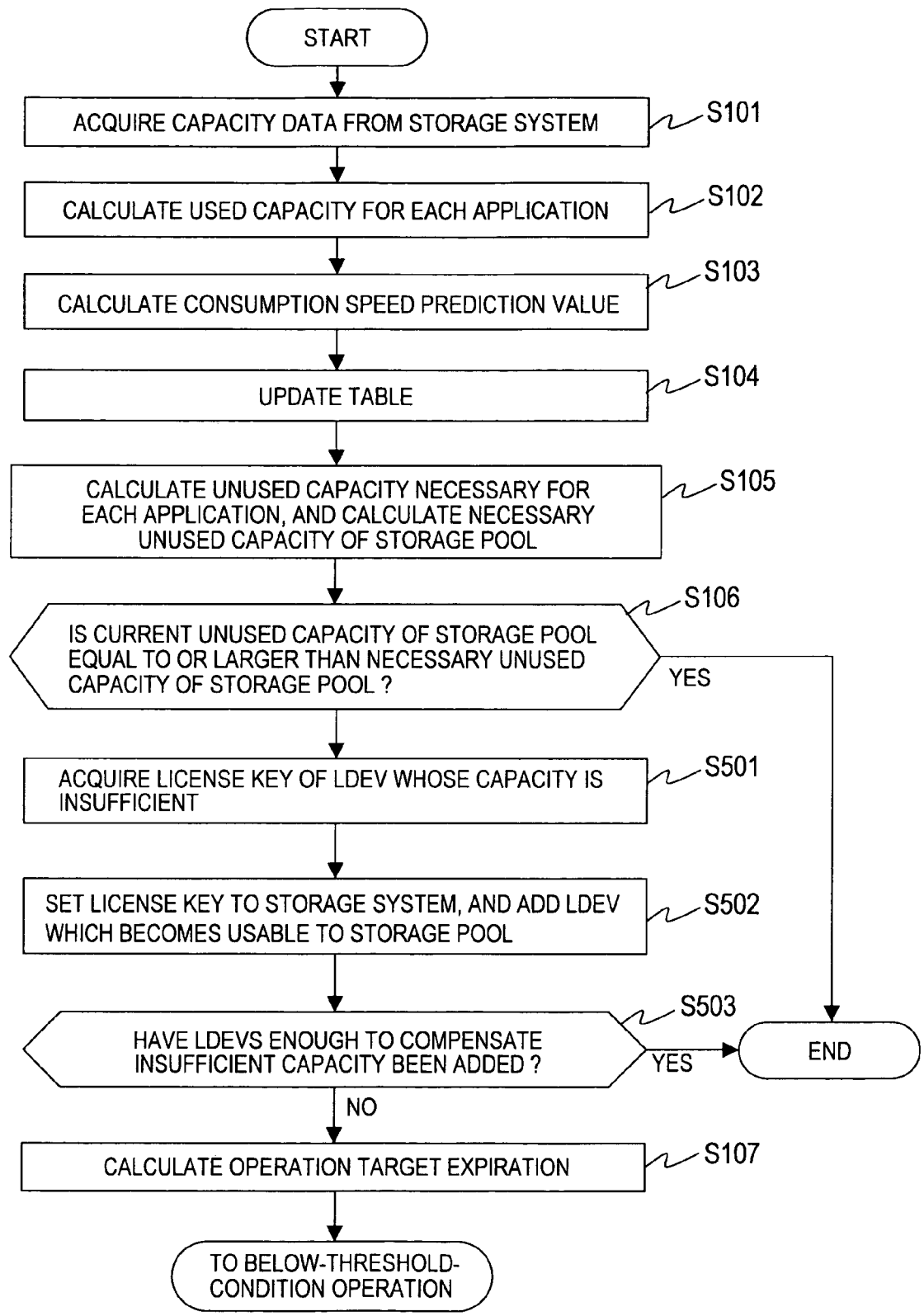
FIG. 18 is a flow chart for describing process operations as to operations of the management server during normal operation in the fifth embodiment of this invention.

FIG. 18 is a flow chart for describing process operations as to operations of the management server 3 during normal operation in the fifth embodiment of this invention.

The process operations as to the operations of the management server 3 during normal operation in the fifth embodiment of this invention includes Step S308. Since other steps are the same as those contained in the process operation (FIG. 12) as to the operations of the management server 3 during the normal operation in the first embodiment of this invention, explanations thereof are omitted.

When the process operation of Step S106 is accomplished, the management server 3 calculates a shortage of capacity of the storage pool 28 by subtracting the unused capacity 454 extracted in Step S106 from the necessary unused capacity of the storage pool 28 calculated in Step S105.

Next, the management server 3 acquires from a license server (not shown) a license key of the LDEV 281 having a capacity equal to or larger than the calculated short capacity (S501). Next, the management server 3 sets the acquired license key to the storage system 2. As a result, the LDEV 281 having the capacity equal to or larger than the short capacity can be used.

Next, the management server 3 adds the usable LDEV 281 to the storage pool 28 (S502).

Next, the management server 3 judges whether or not the LDEV 281 having the capacity equal to or larger than the calculated short capacity can be added to the storage pool 28 (S503).

When the LDEV 281 having the capacity equal to or larger than the calculated short capacity cannot be added to the storage pool 28, the processing of the server 3 advances to Step S107.

On the other hand, when the LDEV 281 having the capacity equal to or larger than the calculated short capacity can be added to the storage pool 28, the management server 3 terminates the process operation under a normal condition.

While the present invention has been described in detail and pictorially in the accompanying drawings, the present invention is not limited to such detail but covers various obvious modifications and equivalent arrangements, which fall within the purview of the appended claims.

What is claimed is:

1. A capacity monitoring method used for a computer system,
the computer system comprising: at least one application computer including a processor, a memory, and an interface; at least one storage system coupled to the application computer; and a management computer including a processor, a memory, and an interface, which is allowed to access the application computer and the storage system,
the storage system comprising: a physical disk for storing therein data which is required to be written by the application computer; and a disk controller for controlling an input/output of data to the physical disk,
the physical disk including a storage area belonging to a storage pool,
the capacity monitoring method comprising:
providing, by the storage system, to the application computer at least one volume to which data is required to be written from the application computer;
executing, by the application computer, at least one application program which requests to read/write data from/to the volume;
allocating, by one of the management computer and the storage system, a part or entirety of the storage area belonging to the storage pool to the volume;
monitoring, by the management computer, a used capacity of the storage pool corresponding to a capacity of a storage area which is allocated to the volume within the storage area belonging to the storage pool, and an unused capacity of the storage pool corresponding to a capacity of a storage area which is not allocated to the volume within the storage area belonging to the storage pool;
judging, by the management computer, whether or not a storage capacity required for operating the application computer for a predetermined time period is present in the storage pool based upon an increasing speed of the used capacity of the storage pool to be monitored, and the unused capacity of the storage pool to be monitored;
executing, by the management computer, a predetermined process operation in the case where the storage capacity required for operating the application computer for the predetermined time period is not present in the storage pool,
determining whether a capacity consumption speed prediction value of one of the application programs is larger than an abnormal operation threshold value,
specifying, by the management computer, in the predetermined process operation, that said one of the application programs is operated under an abnormal condition, based on a determination that the capacity consumption speed prediction value of the application program is larger than the abnormal operation threshold value, among the application programs executed by the application computer; and
instructing, by the management computer, the application computer to suspend the operation of the specified application program.

2. The capacity monitoring method according to claim 1, wherein the volume comprises a thin provisioning volume to which the storage area of the physical disk is allocated in response to a write request issued from the application computer, and
the capacity monitoring method further comprises recognizing, by the application computer, the provided thin provisioning volume as a volume having a capacity equal to or larger than the capacity of the storage area of the physical disk allocated to the thin provisioning volume.

3. The capacity monitoring method according to claim 1, further comprising:
monitoring, by the management computer, a used capacity of the application program corresponding to a capacity of a storage area allocated to the volume required to be written by the application program, for each of the application programs;
totalizing, by the management computer, used capacities of all of the application programs executed by the application computer to calculate the used capacity of the storage pool; and
monitoring, by the management computer, the calculated used capacity of the storage pool.

4. The capacity monitoring method according to claim 1, further comprising:
setting priorities for the application programs; and
instructing, by the management computer, in the predetermined process operation, one of the storage system and the application computer to limit a write from the application program which has been set to a low priority.

5. The capacity monitoring method according to claim 1, further comprising:
setting priorities for the application programs; and
instructing, by the management computer, in the predetermined process operation, the application computer to suspend an operation of the application program which has been set to a low priority.

6. The capacity monitoring method according to claim 1, further comprising:
setting priorities for the application programs; and
prohibiting, by the management computer, in the predetermined process operation, that a pad or entirety of the storage area belonging to the storage pool is additionally allocated to the volume required to be written by the application program which has been set to a low priority.

7. The capacity monitoring method according to claim 1, further comprising:
setting priorities for the application programs; and
preferentially allocating, by the management computer, in the predetermined process operation, a part or entirety of the storage area which has not been allocated to any of the volumes within the storage area belonging to the storage pool to the volume required to be written by the application program which has been set to a high priority.

8. The capacity monitoring method according to claim 1, further comprising:
monitoring, by one of the management computer and the storage system, in the predetermined process operation, a used capacity of the application program corresponding to the capacity of the storage area allocated to the volume required to be written by the application program for each of the application programs;
calculating, by one of the management computer and the storage system, a storage capacity which is required for operating the application program for a predetermined time period based upon an increasing speed of the used capacity of the application program for each of the application programs; and
referring, by one of the management computer and the storage system, to the calculated storage capacity required for operating the application program for a predetermined time period for each of the application programs to allocate a part or entirety of the storage area which has not been allocated to any of the volumes within the storage area belonging to the storage pool to one of the volumes.

9. The capacity monitoring method according to claim 1, further comprising determining whether a remaining time of operation of one of the application programs set to a default exceeds a remaining operation time threshold value and, if the remaining time of operation exceeds the remaining operation time threshold value, switching operation of the application program to a below-threshold-condition operation.

10. A capacity monitoring method used for a computer system,
the computer system comprising: at least one application computer including a processor, a memory, and an interface; and at least one storage system coupled to the application computer,
the storage system comprising: a physical disk for storing therein data which is required to be written by the application computer; and a disk controller for controlling an input/output of data to the physical disk,
the physical disk including a storage area belonging to a storage pool,
the capacity monitoring method comprising:
providing, by the storage system, to the application computer at least one volume to which data is required to be written from the application computer;
executing, by the application computer, at least one application program which requests to read/write data from/to the volume;
allocating, by the storage system, a part or entirety of the storage area belonging to the storage pool to the volume;
monitoring, by the storage system, a used capacity of the storage pool corresponding to a capacity of a storage area which is allocated to the volume within the storage area belonging to the storage pool, and an unused capacity of the storage pool corresponding to a capacity of a storage area which is not allocated to the volume within the storage area belonging to the storage pool;
judging, by the storage system, whether or not a storage capacity required for operating the application computer for a predetermined time period is present in the storage pool based upon an increasing speed of the used capacity of the storage pool to be monitored, and the unused capacity of the storage pool to be monitored; and
executing, by the storage system, a predetermined process operation in the case where the storage capacity required for operating the application computer for the predetermined time period is not present in the storage pool,
determining whether a capacity consumption speed prediction value of one of the application programs is larger than an abnormal operation threshold value,
specifying, by the storage system, in the predetermined process operation, that said one of the application programs is operated under an abnormal condition, based on a determination that the capacity consumption speed prediction value of the application program is larger than the abnormal operation threshold value, among the application programs executed by the application computer; and
instructing, by the storage system, the application computer to suspend the operation of the specified application program.

11. The capacity monitoring method according to claim 10, wherein the volume comprises a thin provisioning volume to which the storage area of the physical disk is allocated in response to a write request issued from the application computer, and
the capacity monitoring method further comprises recognizing, by the application computer, the provided thin provisioning volume as a volume having a capacity equal to or larger than the capacity of the storage area of the physical disk allocated to the thin provisioning volume.

12. The capacity monitoring method according to claim 10, further comprising:
monitoring, by the storage system, a used capacity of the application program corresponding to a capacity of a storage area allocated to the volume required to be written by the application program, for each of the application programs;
totalizing, by the storage system, used capacities of all of the application programs executed by the application computer to calculate the used capacity of the storage pool; and
monitoring, by the storage system, the calculated used capacity of the storage pool.

13. The capacity monitoring method according to claim 10, further comprising:
setting priorities for the application programs; and
instructing, by the storage system, in the predetermined process operation, one of the storage system and the application computer to limit a write from the application program which has been set to a low priority.

14. The capacity monitoring method according to claim 10, further comprising:
setting priorities for the application programs; and
instructing, by the storage system, in the predetermined process operation, the application computer to suspend an operation of the application program which has been set to a low priority.

15. The capacity monitoring method according to claim 10, further comprising:
setting priorities for the application programs; and
prohibiting, by the storage system, in the predetermined process operation, that a part or entirety of the storage area belonging to the storage pool is additionally allocated to the volume required to be written by the application program which has been set to a low priority.

16. The capacity monitoring method according to claim 10, further comprising:
setting priorities for the application programs; and
preferentially allocating, by the storage system, in the predetermined process operation, a part or entirety of the storage area which has not been allocated to any of the volumes within the storage area belonging to the storage pool to the volume required to be written by the application program which has been set to a high priority.

17. The capacity monitoring method according to claim 10, further comprising:
monitoring, by the storage system, in the predetermined process operation, a used capacity of the application program corresponding to the capacity of the storage area allocated to the volume required to be written by the application program for each of the application programs;
calculating, by the storage system, a storage capacity which is required for operating the application program for a predetermined time period based upon an increasing speed of the used capacity of the application program for each of the application programs; and
referring, by the storage system, to the calculated storage capacity required for operating the application program for a predetermined time period for each of the application programs to allocate a part or entirety of the storage area which has not been allocated to any of the volumes within the storage area belonging to the storage pool to one of the volumes.

18. The capacity monitoring method according to claim 10, further comprising determining whether a remaining time of operation of one of the application programs set to a default exceeds a remaining operation time threshold value and, if the remaining time of operation exceeds the remaining operation time threshold value, switching operation of the application program to a below-threshold-condition operation.

19. A computer system, comprising:
   at least one application computer including a processor, a memory, and an interface;
   at least one storage system coupled to the application computer; and
   a management computer including a processor, a memory, and an interface, which is allowed to access the application computer and the storage system; wherein:
   the storage system comprises a physical disk for storing therein data which is required to be written by the application computer and a disk controller for controlling an input/output of data to the physical disk;
   the storage system provides at least one volume to which data is required to be written from the application computer to the application computer;
   the physical disk includes a storage area belonging to a storage pool;
   the application computer executes at least one application program which requests to read/write data from/to the volume;
   one of the management computer and the storage system allocates a part or entirety of the storage area belonging to the storage pool to the volume;
   the management computer monitors a used capacity of the storage pool corresponding to a capacity of a storage area which is allocated to the volume within the storage area belonging to the storage pool, and an unused capacity of the storage pool corresponding to a storage area which is not allocated to the volume within the storage area belonging to the storage pool;
   the management computer judges whether or not a storage capacity required for operating the application computer for a predetermined time period is present in the storage pool based upon an increasing speed of the used capacity of the storage pool to be monitored, and the unused capacity of the storage pool to be monitored;
   the management computer executes a predetermined process operation in the case where the storage capacity required for operating the application computer for the predetermined time period is not present in the storage pool,
   the management computer determines whether a capacity consumption speed prediction value of one of the application programs is larger than an abnormal operation threshold value,
   the management computer specifies, in the predetermined process operation, that said one of the application programs is operated under an abnormal condition, based on a determination that the capacity consumption speed prediction value of the application program is larger than the abnormal operation threshold value, among the application programs executed by the application computer; and
   the management computer instructs the application computer to suspend the operation of the specified application program.

20. The capacity monitoring method according to claim 19, further comprising the management computer determining whether a remaining time of operation of one of the application programs set to a default exceeds a remaining operation time threshold value and, if the remaining time of operation exceeds the remaining operation time threshold value, the management computer switching operation of the application program to a below-threshold-condition operation.

* * * * *